(12) United States Patent
Lee et al.

(10) Patent No.: US 12,546,050 B2
(45) Date of Patent: Feb. 10, 2026

(54) MOTOR FIXING STRUCTURE AND WASHING MACHINE INCLUDING THE SAME

(71) Applicant: Samsung Electronics Co., Ltd., Suwon-si (KR)

(72) Inventors: Unyong Lee, Suwon-si (KR); Myungbae Bang, Suwon-si (KR); Myunggui Choi, Suwon-si (KR); Jonggu Kim, Suwon-si (KR); Jinhyung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 18/382,897

(22) Filed: Oct. 23, 2023

(65) Prior Publication Data

US 2024/0191419 A1    Jun. 13, 2024

Related U.S. Application Data

(63) Continuation of application No. PCT/KR2023/015514, filed on Oct. 10, 2023.

(30) Foreign Application Priority Data

Dec. 7, 2022  (KR) .................. 10-2022-0170041

(51) Int. Cl.
*D06F 37/30*       (2020.01)
*H02K 1/18*        (2006.01)
*H02K 5/22*        (2006.01)
*H02K 7/08*        (2006.01)

(52) U.S. Cl.
CPC ............ *D06F 37/304* (2013.01); *H02K 1/18* (2013.01); *H02K 5/225* (2013.01); *H02K 7/083* (2013.01); *H02K 2213/03* (2013.01)

(58) Field of Classification Search
CPC ...................................... D06F 37/304
See application file for complete search history.

(56) References Cited

U.S. PATENT DOCUMENTS

| 9,929,616 B2 | 3/2018 | Jang et al. |
| 11,047,082 B2 | 6/2021 | Jeoung et al. |
| 2008/0289370 A1 | 11/2008 | Byun et al. |

(Continued)

FOREIGN PATENT DOCUMENTS

| CN | 103828198 A | 5/2014 |
| CN | 105703517 A | 6/2016 |

(Continued)

OTHER PUBLICATIONS

International Search Report dated Jan. 10, 2024 for International Application No. PCT/KR2023/015514.

(Continued)

*Primary Examiner* — Jason Y Ko
(74) *Attorney, Agent, or Firm* — STAAS & HALSEY LLP

(57) ABSTRACT

An apparatus including a motor including a stator including a core, a rotor inside the stator, and rotatable by interacting with the stator, and a rotation shaft mounted on the rotor so as to be rotatable together with the rotor, and a bracket including a main body unit including a space in which the stator is mounted, a front mount at a front of the main body unit, and including a front fastening hole, and a rear mount at a rear of the main body unit, and including a rear fastening hole.

20 Claims, 18 Drawing Sheets

(56) References Cited

U.S. PATENT DOCUMENTS

| | | |
|---|---|---|
| 2009/0051237 A1 | 2/2009 | Weber |
| 2015/0256056 A1 | 9/2015 | Kim et al. |
| 2016/0344250 A1 | 11/2016 | Jang et al. |
| 2018/0258577 A1 | 9/2018 | Lee et al. |
| 2020/0270798 A1 | 8/2020 | Lee et al. |
| 2022/0251757 A1 | 8/2022 | An et al. |

FOREIGN PATENT DOCUMENTS

| | | |
|---|---|---|
| CN | 110380554 A | 10/2019 |
| CN | 210111741 U | 2/2020 |
| CN | 111245169 A | 6/2020 |
| DE | 10 2005 060 362 A1 | 6/2007 |
| EP | 3 064 632 B1 | 12/2020 |
| KR | 10-0400748 B1 | 10/2003 |
| KR | 10-0447166 B1 | 9/2004 |
| KR | 10-1185121 B1 | 9/2012 |
| KR | 10-2013-0063212 | 6/2013 |
| KR | 10-1576149 B1 | 12/2015 |
| KR | 10-2016-0137009 | 11/2016 |
| KR | 10-1686240 B1 | 12/2016 |
| KR | 10-1707142 | 2/2017 |
| KR | 10-2018-0020481 | 2/2018 |
| WO | WO 2017/034196 A1 | 3/2017 |

OTHER PUBLICATIONS

Extended European Search Report dated Sep. 26, 2025, issued in European Application No. EP 23 90 0862.

MOTOR FIXING STRUCTURE AND WASHING MACHINE INCLUDING THE SAME

CROSS-REFERENCE TO RELATED APPLICATION

This application is a continuation application, under 35 U.S.C. § 111(a), of International Application No. PCT/KR2023/015514, filed on Oct. 10, 2023, which claims priority under 35 U.S.C. § 119 to Korean Patent Application No. 10-2022-0170041, filed on Dec. 7, 2022, in the Korean Intellectual Property Office, the disclosures of which are incorporated herein by reference in their entireties.

TECHNICAL FIELD

The disclosure relates to a motor fixing structure and a washing machine including the motor fixing structure.

BACKGROUND ART

A motor is a machine for obtaining a rotational force from electric energy and includes a stator and a rotor. The rotor is configured to electromagnetically interact with the stator and is rotated by a force acting between a magnetic field and a current flowing in a coil.

The motor is one of the important components constituting a washing machine, and as the motor rotates a rotatable tub (basket), contamination of laundry is removed by friction, and moisture from the laundry which has been washed is removed by centrifugal force.

A motor of a belt driven drum washing machine is assembled in connection to the tub of the washing machine. The belt driven drum washing machine connects the motor to the rotatable tub (basket) through a belt, and rotates the rotatable tub (basket) through the motor and the belt to wash the laundry. Such a belt driven motor is commonly used in drum washing machines.

Meanwhile, in order to assemble the motor in the washing machine, various components are necessary. The motor may be assembled in connection to the washing machine through a bracket, and in order to assemble the motor within the bracket, various components such as assembly bolts are required.

DESCRIPTION OF EMBODIMENTS

Solution to Problem

According to an embodiment of the disclosure, an apparatus includes a motor including a stator including a core, a rotor inside the stator, and rotatable by interacting with the stator, and a rotation shaft mounted on the rotor so as to be rotatable together with the rotor, and a bracket including a main body unit including a space in which the stator is mounted, a front mount at a front of the main body unit, and including a front fastening hole, and a rear mount at a rear of the main body unit, and including a rear fastening hole. The front fastening hole is configured to receive a first fastener, and the rear fastening hole is configured to receive a second fastener, to fix the motor to a device having a component that is rotatable by the motor.

According to an embodiment of the disclosure, the main body unit, the front mount, and the rear mount may be an integrally injection molded structure.

According to an embodiment of the disclosure, the rear mount may include a rear fastening unit including the rear fastening hole, and a rear connection unit having one side connected to the rear fastening unit, and another side connected to the main body unit.

According to an embodiment of the disclosure, the front mount may include a front fastening unit including the front fastening hole, and a front connection unit having one side connected to the front fastening unit, and another side connected to the main body unit.

According to an embodiment of the disclosure, the front connection unit may include a first front connection unit connecting the main body unit to the front fastening unit, and a second front connection unit connecting the main body unit to the front fastening unit. The first front connection unit may be shaped differently than the second front connection unit.

According to an embodiment of the disclosure, an angle between a first straight line extending longitudinally through a center of the first front connection unit and a second straight line extending longitudinally through a center of the second front connection unit may be 20 degrees to 80 degrees.

According to an embodiment of the disclosure, a rear end of the rear mount may protrude further in a rearward direction than the rear of the main body unit.

According to an embodiment of the disclosure, the main body unit may be an injection molded after the stator is inserted into the main body unit.

According to an embodiment of the disclosure, the apparatus may further include a connection terminal in the main body unit and connected to the stator; and a terminal unit including a first terminal cover, the first terminal cover configured in a plate shape to cover at least one of an upper portion and a side portion of the connection terminal, wherein the main body unit is injection molded after the terminal unit is inserted into the main body unit.

According to an embodiment of the disclosure, the apparatus may further include a terminal unit in the main body unit and including a connection terminal connected to the stator, and a second terminal cover in the main body unit to cover at least one of an upper portion and a side portion of the connection terminal and wherein the second terminal cover is integrally injection molded with the main body unit after the terminal portion is inserted.

According to an embodiment of the disclosure, with a first circle around the main body unit being concentric with a second circle passing through a center of the rear fastening hole, and the second circle being concentric with a third circle passing through a center of the front fastening hole, the apparatus may have a structure in which a diameter of the first circle<a diameter of the second circle<a diameter of the third circle.

According to an embodiment of the disclosure, the apparatus may further include a coupling bearing on a first side of the rotor and coupled to the rotation shaft; a fixing bearing on a second side of the rotor and coupled to the rotation shaft; a coupling cover press-fitted and connected to the main body unit over the rotor and the rotation shaft mounted inside the main body unit; a fixing groove in the main body unit and into which the fixing bearing is press-fitted; and a coupling groove in the coupling cover and into which the coupling bearing is press-fitted.

According to an embodiment of the disclosure, while the fixing bearing coupled to the rotation shaft is press-fitted into the fixing groove, the rotor and the rotation shaft are inserted into the main body unit, and after the rotor and the rotation shaft are inserted into the main body unit, while the coupling cover is press-fitted into the main body unit, the coupling bearing coupled to the rotation shaft is press-fitted into the coupling groove of the coupling cover.

According to an embodiment of the disclosure, the coupling cover may include a caulking protrusion protruding outward from an outer circumferential surface of the coupling cover. An outwardly widened inclination may be formed on the caulking protrusion.

According to an embodiment of the disclosure, the apparatus may further include a first fixing component inserted into the front fastening hole, and a second fixing component inserted into the rear fastening hole and including an incision groove on an outer diameter of the second fixing component. The first fixing component may include an elastic body. Diameters of a first end of the first fixing component and a second end of the first fixing component may be greater than a diameter of the front fastening hole.

According to an embodiment of the disclosure, a washing machine includes a cabinet; a tub inside the cabinet and having an opened front surface; a rotatable tub inside the tub; and a motor configured to rotate the rotatable tub, the motor including a stator including a core, a rotor inside the stator, and rotatable by interacting with the stator, and a rotation shaft mounted on the rotor so as to be rotatable together with the rotor, and a bracket including a main body unit including a space in which the stator is mounted, a front mount at a front of the main body unit, and including a front fastening hole, and a rear mount at a rear of the main body unit, and including a rear fastening hole. The front fastening hole is configured to receive a first fastener, and the rear fastening hole is configured to receive a second fastener, to couple the motor to the tub.

According to an embodiment of the disclosure, the washing machine may further include a first fastening protrusion inserted into the front fastening hole and protruding outward from a lower portion of a rear surface of the tub; and a second fastening protrusion inserted into the rear fastening hole and protruding outward from the lower portion of the rear surface of the tub.

According to an embodiment of the disclosure, after a first fixing component is inserted into the front fastening hole, a first fastening protrusion is inserted into the front fastening hole, after a second fixing component is inserted into the rear fastening hole a second fastening protrusion is inserted into the rear fastening hole, the first fixing component comprises an elastic body, and diameters of one end and another end of the first fixing component are greater than a diameter of the front fastening hole, and an incision groove is formed outside the second fixing component, and a coupling protrusion is provided outside the second fastening protrusion.

According to an embodiment of the disclosure, the washing machine may further include a rotatable tub pulley installed on a rear surface of the tub; a drive shaft connecting the rotatable tub pulley to the rotatable tub; a pulley coupled to the rotation shaft; and a belt connecting the pulley to the rotatable tub pulley.

According to an embodiment of the disclosure, provided is bracket of a motor fixing structure for fixing a motor to an device, the bracket comprising a main body unit including a space in which the stator is mountable; a front mount at a front of the main body unit, and including a front fastening hole; and a rear mount at a rear of the main body unit, and including a rear fastening hole. The main body unit, the front mount, and the rear mount are an integrally injection molded structure, and the front fastening hole is configured to receive a first fastener, and the rear fastening hole is configured to receive a second fastener, to fix the motor to the device.

MODE OF DISCLOSURE

Figure 1:
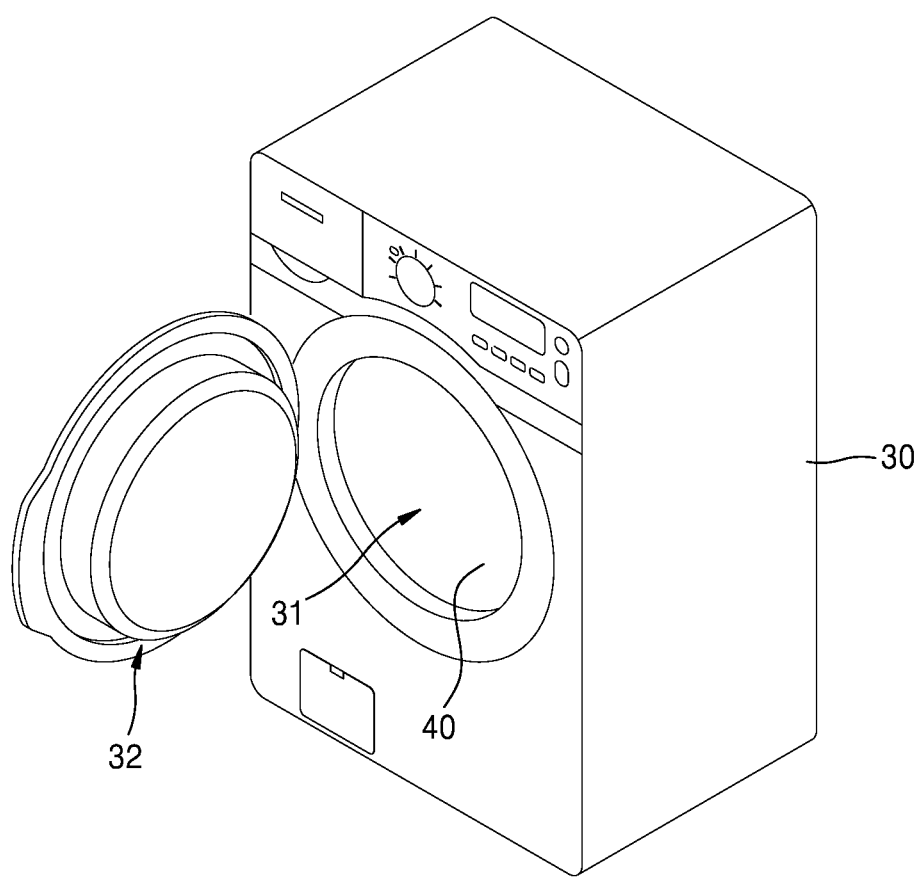
FIG. 1 is a schematic perspective view of a washing machine including a motor fixing structure, according to an embodiment of the disclosure.

Throughout the disclosure, the expression "at least one of a, b, or c" indicates only a, only b, only c, both a and b, both a and c, both b and c, all of a, b, and c, or variations thereof. Hereinafter, embodiments according to the disclosure are described in detail with reference to the details described in the accompanying drawings. The same reference numerals or characters presented in each figure indicate components or elements for performing substantially the same function.

Terms including an ordinal number, such as "first", "second", or the like, may be used to describe various elements, and the elements are not limited by the terms. The above terms are used only to distinguish one element from another element. For example, a first element may be referred to as a second element, and similarly, a second element may be referred to as first element, without departing from the scope of protection of the disclosure. The expression "and/or" includes a combination of a plurality of related items or any one item from among a plurality of related items.

Terms used in the disclosure are used to describe an embodiment and are not intended to limit the disclosure. An expression used in the singular may encompass the expression in the plural, unless it has a clearly different meaning in the context. In the disclosure, terms, such as "include", "comprise", or "have", are intended to designate the presence a feature, number, step, operation, element, or a combination thereof described in the disclosure, and are not to be construed to exclude, in advance, the possibility of presence or addition of one or more other features, numbers, steps, operations, elements, components, or a combination thereof. The same reference character presented in each figure indicates members for performing substantially the same function.

A motor fixing structure 100 according to an embodiment of the disclosure may be a structure for fixing a motor to an electronic device. The electronic device according to an embodiment of the disclosure may be a washing machine 1 (e.g., a drum washing machine).

FIG. 1 is a schematic perspective view of the washing machine 1 including the motor fixing structure 100, according to an embodiment of the disclosure. The washing machine 1 according to an embodiment of the disclosure may include a cabinet 30, a tub 10, a rotatable tub 40, and the motor fixing structure 100.

Figure 2:
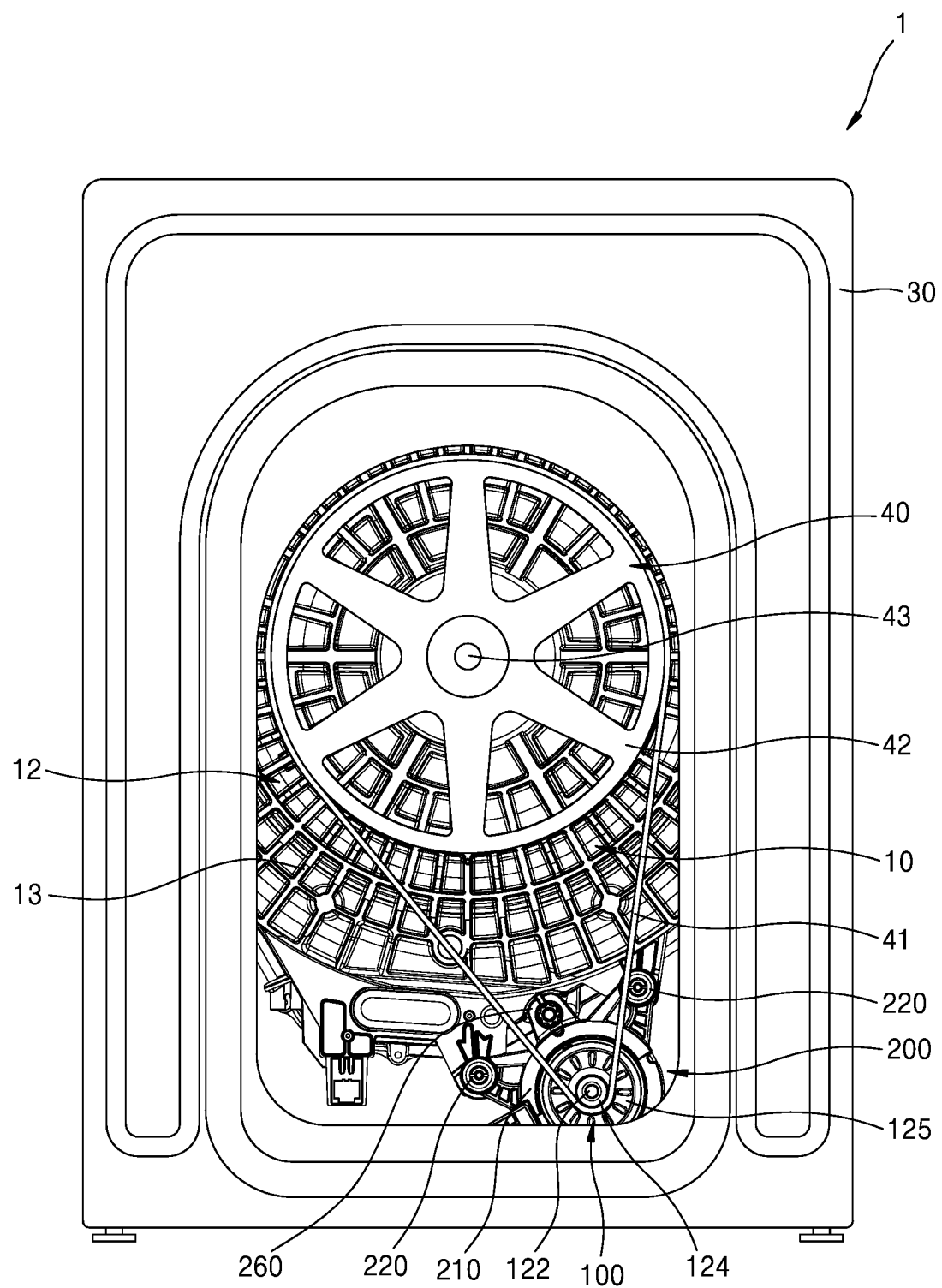
FIG. 2 is a schematic diagram illustrating a case in which a tub is arranged inside a cabinet of a washing machine, according to an embodiment of the disclosure.

FIG. 2 is a schematic diagram illustrating that the tub 10 is arranged inside the cabinet 30 of the washing machine, according to an embodiment of the disclosure. The cabinet 30 according to an embodiment of the disclosure may be a frame of the washing machine 1, and an input port 31 may be provided at the front of the cabinet 30 so as to input laundry into the rotatable tub 40. The input port 31 may be installed at the front of the cabinet 30 and may be opened and closed by the door 32.

The tub 10 according to an embodiment of the disclosure is arranged inside the cabinet 30 and may be coupled to the motor fixing structure 100. In the tub 10, a water supply pipe for supplying washing water and a drain pipe for discharging water inside the tub 10 may be installed.

For example, the water supply pipe may supply the washing water to the rotatable tub 40 installed inside the tub 10, and the drain pipe may discharge water from the rotatable tub 40 installed inside the tub 10 to the outside.

A front surface 11 of the tub 10 according to an embodiment of the disclosure may be opened, and a coupling housing may be provided on a rear surface 12 of the tub 10. The coupling housing provided on the rear surface 12 of the tub 10 may include a first fastening protrusion 21 and a second fastening protrusion 22, to which the motor fixing structure 100 may be coupled.

A rib 13 for reinforcing the strength of the tub 10 may be provided on the rear surface 12 of the tub 10, and a drive shaft coupling unit 14 to which a drive shaft of the rotatable tub 40 may be coupled may be provided in the tub 10.

Figure 3:
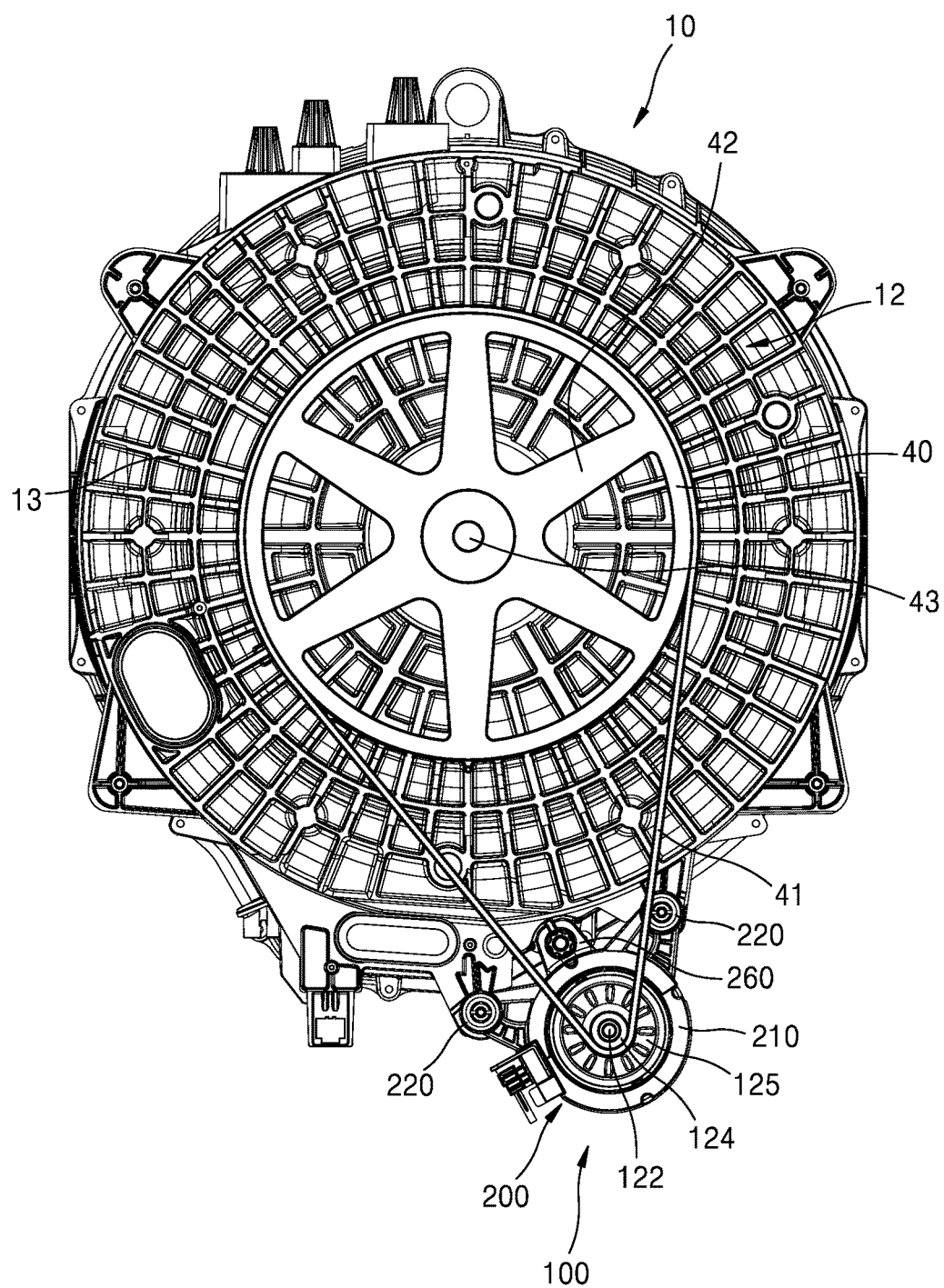
FIG. 3 is a schematic diagram illustrating a case in which a pulley of a motor fixing structure and a pulley of a rotatable tub are connected to each other through a belt, according to an embodiment of the disclosure.
Figure 4:
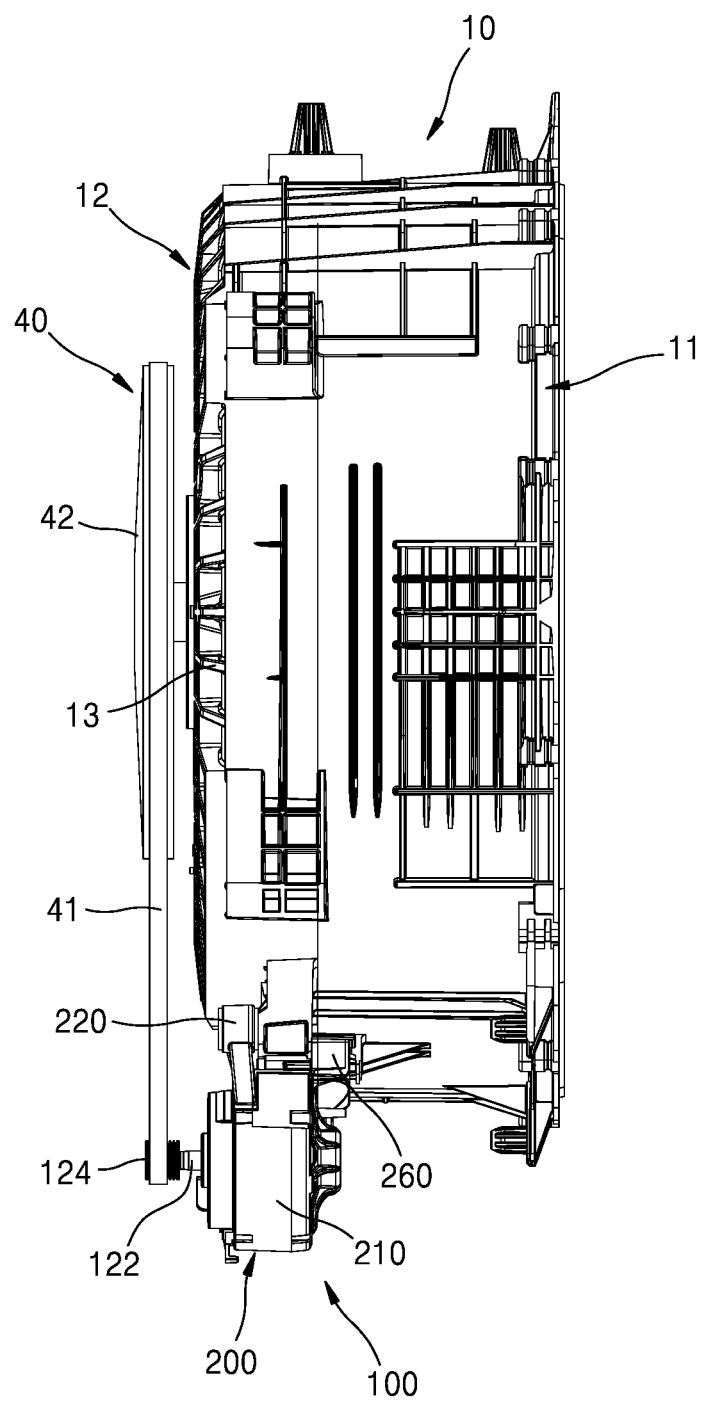
FIG. 4 is a schematic side view illustrating a case in which a pulley of a motor fixing structure and a pulley of a rotatable tub are connected to each other through a belt, according to an embodiment of the disclosure.
Figure 5:
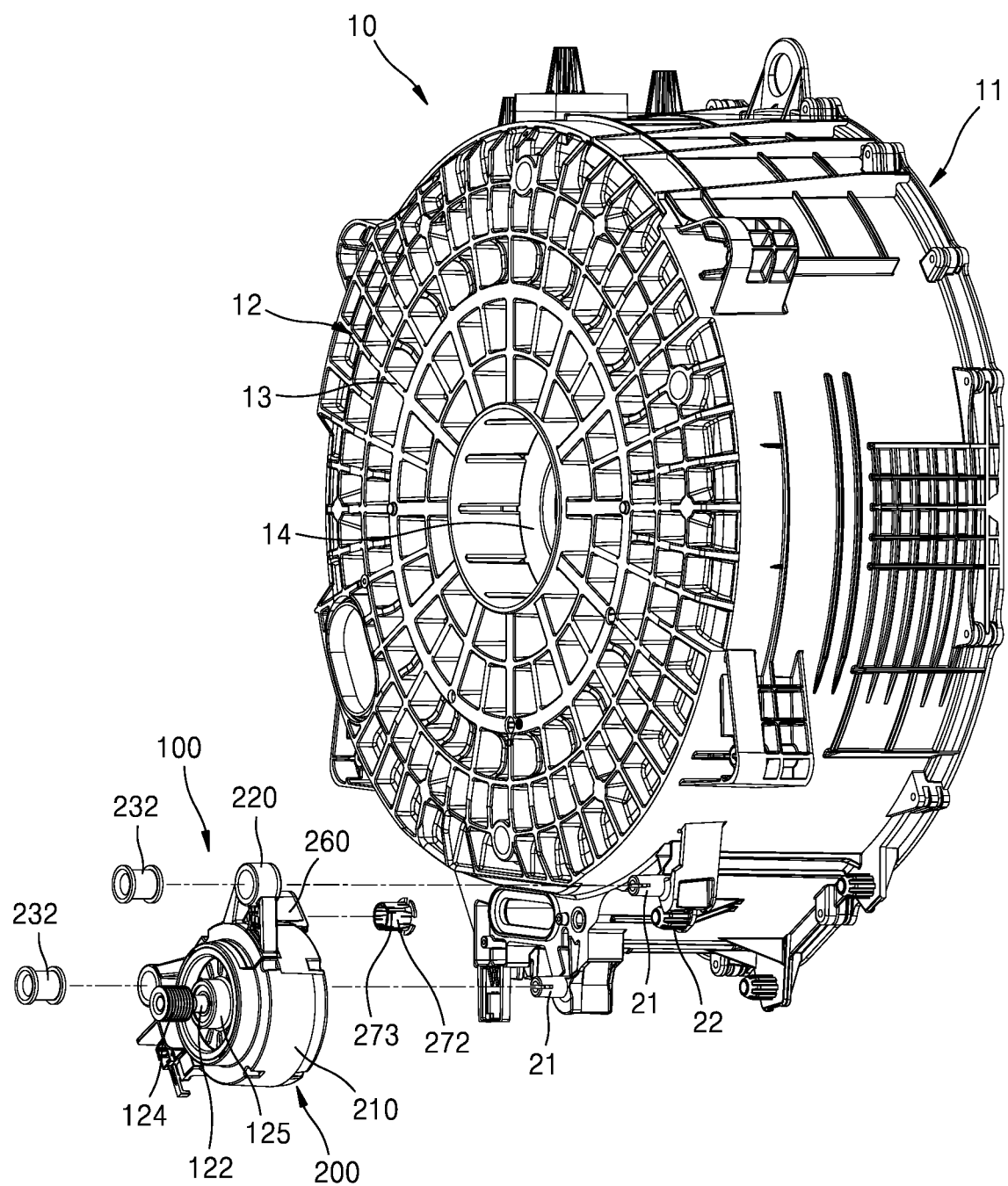
FIG. 5 is a schematic diagram illustrating a case in which a motor fixing structure is coupled to a tub, according to an embodiment of the disclosure.

FIG. 3 is a schematic diagram illustrating that a pulley 124 of the motor fixing structure 100 and the rotatable tub 40 are connected to each other through a belt 41, according to an embodiment of the disclosure, and FIG. 4 is a schematic side view illustrating that the pulley 124 of the motor fixing structure 100 and the rotatable tub 40 are connected to each other through the belt 41, according to an embodiment of the disclosure. FIG. 5 is a diagram illustrating that the motor fixing structure 100 is coupled to the tub 10, according to an embodiment of the disclosure.

Referring to FIGS. 3 and 4, the motor fixing structure 100 according to an embodiment of the disclosure may be coupled to the tub 10. The motor fixing structure 100 according to an embodiment of the disclosure may include a stator 110 having a core around which a coil is wound, a rotor 121 rotated by interacting with the stator 110, a rotation shaft 122 rotated together with the rotor 121, and a bracket 200 on which the stator 110 is mounted.

The bracket 200 according to an embodiment of the disclosure may include a main body unit 210 having a space in which the stator 110 is mounted, a front mount 220 provided on a front 211 of the main body unit 210 and including a front fastening hole 231, and a rear mount 260 provided on a rear 212 of the main body unit 210 and including a rear fastening hole 271.

According to an embodiment of the disclosure, a rotational force may be provided to the rotatable tub 40 inside the tub 10 through the stator 110 and the rotor 121 of the motor fixing structure 100. The rotatable tub 40 according to an embodiment of the disclosure is rotatably arranged inside the tub 10, and the rotatable tub 40 may be rotated by receiving a rotational force from the motor fixing structure 100.

The rotatable tub 40 may be a basket having a space for placing laundry, and the rotatable tub 40 may be rotated by receiving the rotational force from the stator 110 and the rotor 120 of the motor fixing structure 100. The motor fixing structure 100 according to an embodiment of the disclosure may include the pulley 124 at one side of the rotation shaft 122.

Referring to FIGS. 3 and 4, the washing machine 1 according to an embodiment of the disclosure may include a rotatable tub pulley 42 connected to the rotatable tub 40 through the drive shaft 43 and rotatably installed on the rear surface 12 of the tub 10, and the belt 41 for connecting the pulley 124, which is coupled to one side of the rotation shaft 122, to the rotatable tub pulley 42.

The rotatable tub 40 according to an embodiment of the disclosure may be connected through the drive shaft 43 to the rotatable tub pulley 42 installed on the rear surface 12 of the tub 10, and the rotatable tub 40 and the rotatable tub pulley 42 may be rotated together by the drive shaft 43.

The belt 41 according to an embodiment of the disclosure may connect the rotatable tub pulley 42 to the pulley 124 coupled to one side of the rotation shaft 122, and one side of the belt 41 may be connected to the pulley provided at one side of the rotation shaft 122, and the other side of the belt 41 may be connected to the rotatable tub 40.

When the rotation shaft 122 is rotated by interaction between the stator 110 and the rotor 122, the pulley 124 provided at one side of the rotation shaft 122 may be rotated. When the pulley 124 is rotated, the belt 41 connected to the pulley 124 may be rotated, and by the rotation of the belt 41, the rotatable tub pulley 42 may be rotated. When the rotatable tub pulley 42 is rotated, the rotatable tub 40 connected to the rotatable tub pulley 42 may be rotated by the drive shaft 43.

Referring to FIGS. 4 and 5, the motor fixing structure 100 according to an embodiment of the disclosure may be coupled to a lower portion of the rear surface 12 of the tub 10. The washing machine 1 according to an embodiment of the disclosure may include the first fastening protrusion 21 inserted into the front fastening hole 231 while protruding from the rear surface 12 of the tub 10 to the outside, and the second fastening protrusion 22 inserted into the rear fastening hole 271 while protruding from the lower portion of the rear surface 12 of the tub 10 to the outside.

Figure 6:
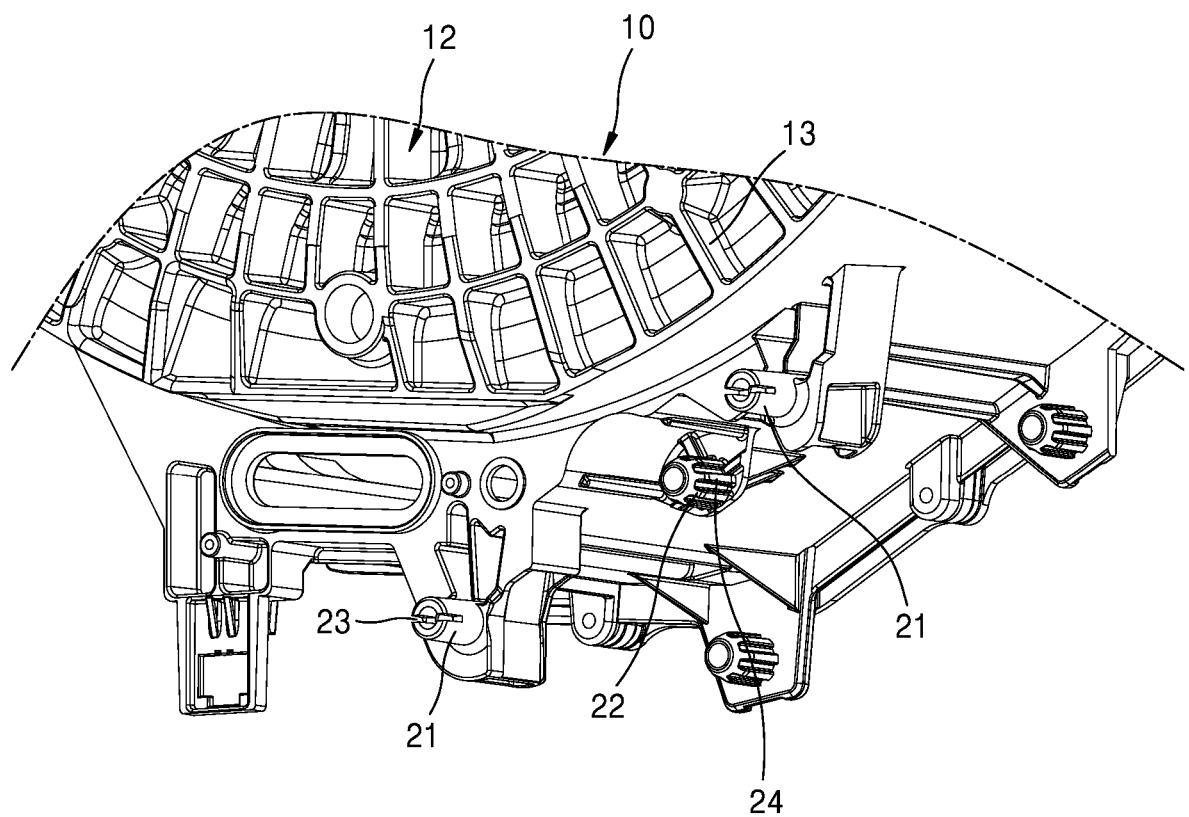
FIG. 6 is a schematic diagram illustrating a washing machine provided with a first fastening protrusion and a second fastening protrusion, according to an embodiment of the disclosure.

FIG. 6 is a schematic diagram illustrating that the first fastening protrusion 21 and the second fastening protrusion 22 are provided in the washing machine 1, according to an embodiment of the disclosure. The motor fixing structure 100 according to an embodiment of the disclosure may be coupled to the tub 10 through the first fastening protrusion 21 and the second fastening protrusion 22, which are provided on the rear surface 12 of the tub 10.

For example, as the first fastening protrusion 21 is inserted into the front fastening hole 231 of the motor fixing structure 100, and the second fastening protrusion 22 is inserted into the rear fastening hole 271 of the motor fixing structure 100, the motor fixing structure 100 may be coupled to the rear surface 12 of the tub 10.

According to an embodiment of the disclosure, when the first fastening protrusion 21 is inserted into the front fastening hole 231 of the motor fixing structure 100 and the second fastening protrusion 22 is inserted into the rear fastening hole 271, a first fixing component 232 and a second fixing component 272 may be used to prevent the first fastening protrusion 21 and the second fastening protrusion 22 from being separated from the front fastening hole 231 and the rear fastening hole 271.

Referring to FIG. 5, when the motor fixing structure 100 is coupled to the tub 10, after the first fixing component 232 is inserted into the front fastening hole 231, the first fastening protrusion 21 may be inserted into the front fastening hole 231. In addition, when the motor fixing structure 100 is coupled to the tub 10, after the second fixing component 272 is inserted into the rear fastening hole 271, the second fastening protrusion 22 may be inserted into the rear fastening hole 271.

The first fixing component 232 according to an embodiment includes an elastic body and may be deformed. Diameters of one end and the other end of the first fixing component 232 may be greater than that of the front fastening hole 231, and through this, when the first fixing component 232 is inserted into the front fastening hole 231, the first fixing component 232 may not be separated from the front fastening hole 231.

The first fixing component 232 includes an elastic body and is deformable, and the first fixing component 232 may include rubber. When the first fixing component 232 is inserted into the front fastening hole 231, the first fixing component 232 may be inserted into the front fastening hole 231 while applying deformation to the first fixing component 232.

According to an embodiment of the disclosure, after the first fixing component 232 is inserted into the front fastening hole 231, the first fastening protrusion 21 may be inserted into the front fastening hole 231. The first fastening protrusion 21 may be tightly inserted into the front fastening hole 231 narrowed by the first fixing component 232.

Referring to FIGS. 5 and 6, a groove 23 may be provided inside the first fastening protrusion 21 according to an embodiment of the disclosure. When the first fastening protrusion 21 is inserted into the front fastening hole 231, the first fastening protrusion 21 may be deformed by the groove 23 of the first fastening protrusion 21.

The first fastening protrusion 21 may include an elastic material, and when the first fastening protrusion 21 is deformed, a restoring force to return to the original state may be generated in the first fastening protrusion 21. The first fastening protrusion 21 may be firmly coupled to the front fastening hole 231 by this restoring force.

An incision groove 273 may be formed outside the second fixing component 272 according to an embodiment of the disclosure. The second fixing component 272 may be inserted into the rear fastening hole 271 while being deformed by the incision groove 273.

The second fixing component may include an elastic material, and when the second fixing component 272 is deformed by the incision groove 273, a restoring force to return to the original state may be generated in the second fixing component 272. By this restoring force, the second fixing component 272 may be inserted into the rear fastening hole 271 without being separated.

According to an embodiment of the disclosure, after the second fixing component 272 is inserted into the rear fastening hole 271, the second fastening protrusion 22 may be inserted into the rear fastening hole 271. Referring to FIGS. 5 and 6, a coupling protrusion 24 may be provided outside the second fastening protrusion 22 according to an embodiment of the disclosure. When the second fastening protrusion 22 is inserted into the rear fastening hole 271, the coupling protrusion 24 of the second fastening protrusion 22 presses the inside of the rear fastening hole 271 so that the second fastening protrusion 22 may be firmly coupled to the rear fastening hole 271.

As described above, after the first fixing component 232 is inserted into the front fastening hole 231, the first fastening protrusion 21 may be inserted into the front fastening hole 231, and after the second fixing component 272 is inserted into the rear fastening hole 271, the second fastening protrusion 22 may be inserted into the rear fastening hole 271, and thus, the motor fixing structure 100 may be coupled to the tub 10.

In the description above, the rotatable tub 40 receives power from the motor fixing structure 100 through the belt 41. However, the disclosure is not limited thereto. The rotatable tub 40 may be connected to the motor fixing structure 10 by a direct drive without using the belt 41 to receive rotational force.

An electronic device to which the motor fixing structure 100 is coupled, according to an embodiment of the disclosure, is not limited to the washing machine 1, and the electronic device to which the motor fixing structure 100 is coupled, according to an embodiment of the disclosure may be a dryer. The motor fixing structure 100 according to an embodiment of the disclosure may be a structure for fixing a motor to an electronic device.

Hereinafter, the motor fixing structure 100 according to an embodiment of the disclosure is described in detail.

Figure 7:
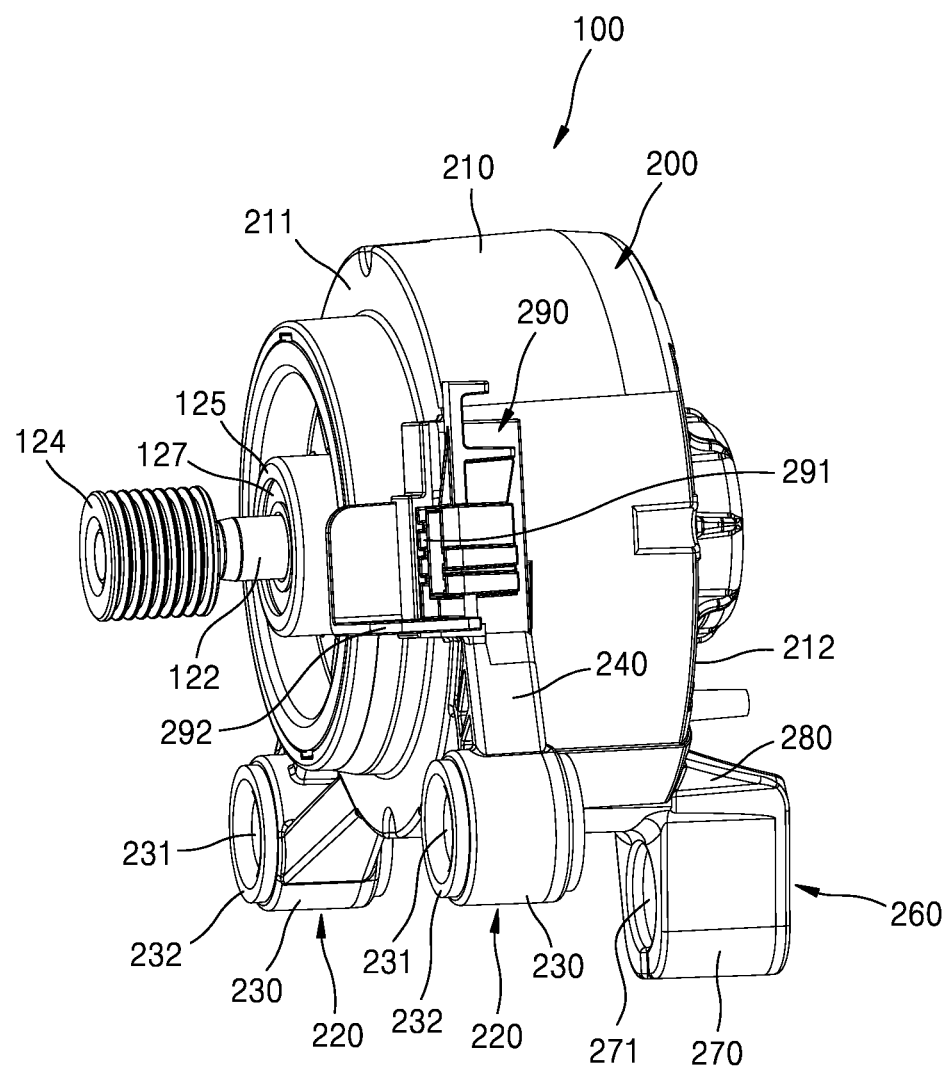
FIG. 7 is a schematic perspective view of a motor fixing structure according to an embodiment of the disclosure.
Figure 8:
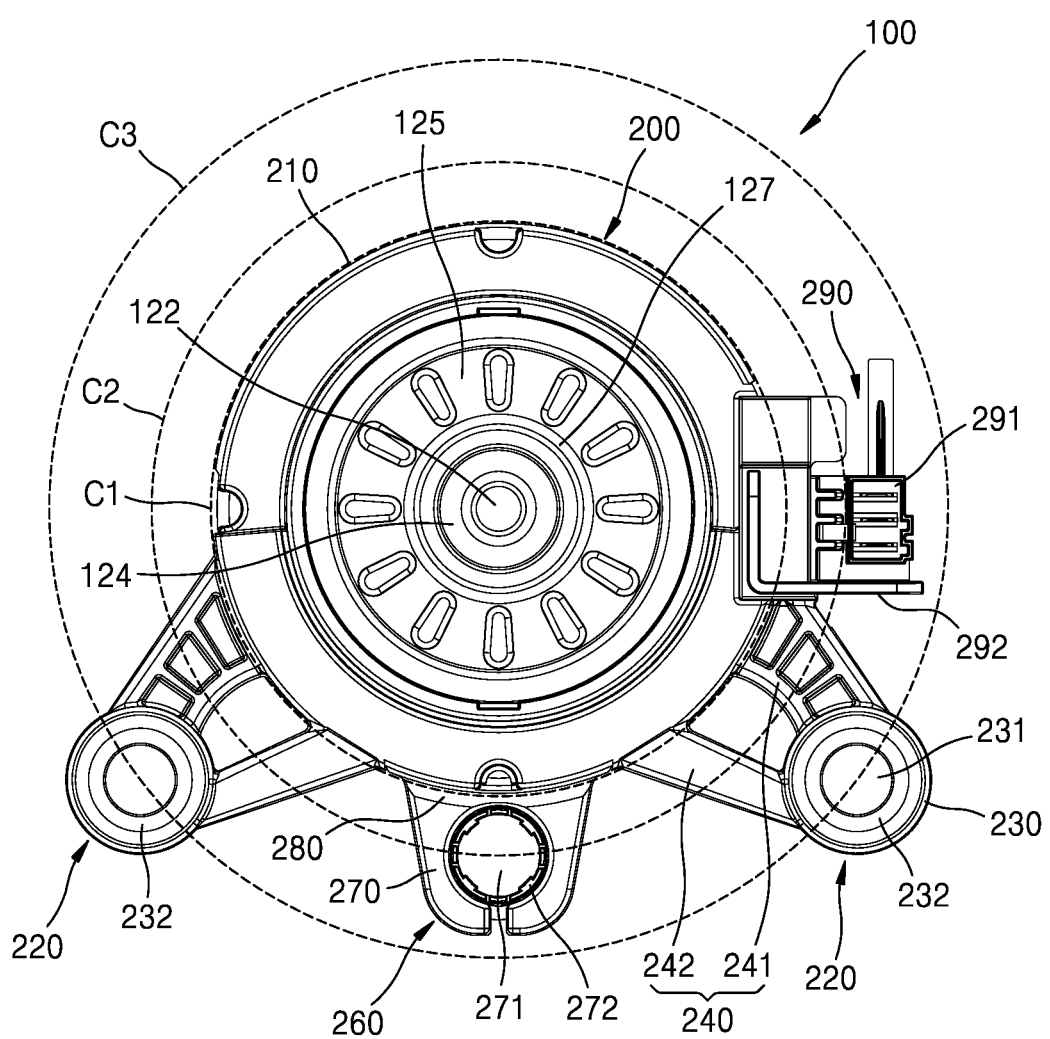
FIG. 8 is a schematic front view of a motor fixing structure according to an embodiment of the disclosure.
Figure 9:
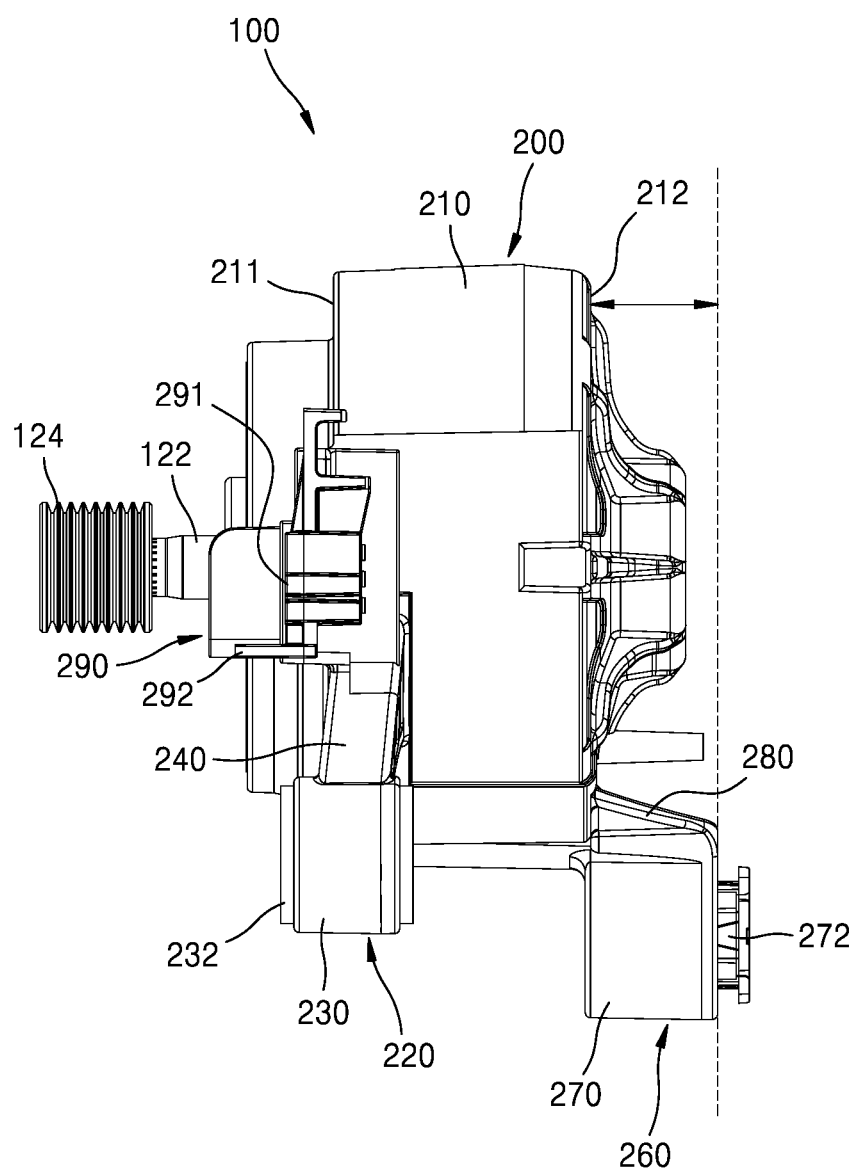
FIG. 9 is a schematic side view of a motor fixing structure according to an embodiment of the disclosure.
Figure 10:
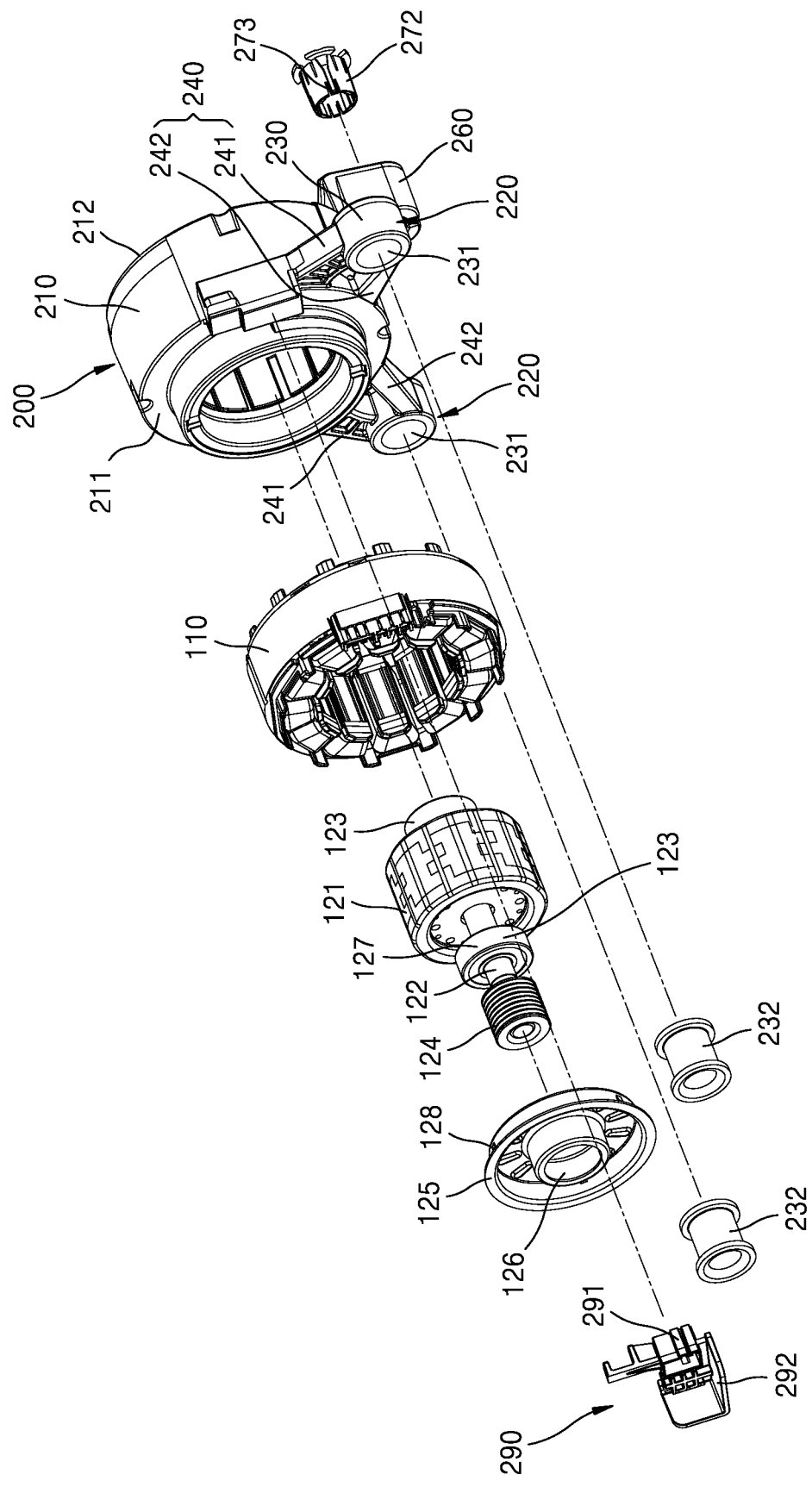
FIG. 10 is a schematic exploded perspective view of a motor fixing structure according to an embodiment of the disclosure.

FIG. 7 is a schematic perspective view of the motor fixing structure 100 according to an embodiment of the disclosure, FIG. 8 is a schematic front view of the motor fixing structure 100 according to an embodiment of the disclosure, and FIG. 9 is a schematic side view of the motor fixing structure 100 according to an embodiment of the disclosure. FIG. 10 is an exploded perspective view of a motor fixing structure according to an embodiment of the disclosure.

Referring to FIGS. 7 to 9, the motor fixing structure 100 according to an embodiment of the disclosure may include the stator 110, the rotor 121, the rotation shaft 122, and the bracket 200.

Referring to FIG. 10, the stator 110 according to an embodiment of the disclosure may include a core around which a coil is wound. The core of the stator 110 may include electrical steel, and a coil may be wound around the core including the electrical steel.

Referring to FIG. 10, the rotor 121 according to an embodiment of the disclosure may be arranged inside the stator 110 and is rotated by interacting with the stator 110. The rotor 121 may be arranged in a space formed inside the stator 110, and the rotor 121 may be spaced apart by a certain distance from an inner surface of the stator 110.

Electric energy may be supplied to the stator 110, and the rotator 121 may include a permanent magnet. When electric energy is supplied to the stator 110, an electromagnetic field may be formed by the core around which the coil is wound. The rotor 121 may be rotated by the electromagnetic field formed by the stator 110.

The rotation shaft 122 may be mounted on the rotor 121 and rotated together with the rotor 121. The rotation shaft 122 may be a shaft extending in a bar shape, and when the rotor 121 is rotated, the rotation shaft 122 mounted on the rotor 121 may also be rotated.

At one side of the rotation shaft 122 according to an embodiment of the disclosure, the pulley 124 to which the belt 41 is connected may be provided. The motor fixing structure 100 according to an embodiment of the disclosure may be assembled in connection to the belt driven drum washing machine 1, and the belt 41 may be connected to the pulley 124 provided at one side of the rotation shaft 122.

Referring to FIGS. 7 and 8, one side of the belt 41 may be connected to the pulley 124 provided at one side of the rotation shaft 122, and the other side of the belt 41 may be connected to the rotatable tub pulley 42 connected to the rotatable tub 40 through the drive shaft 43.

When the rotation shaft 122 is rotated by interaction between the stator 110 and the rotor 121, the pulley 124 provided at one side of the rotation shaft 122 may be rotated. When the pulley 124 is rotated, the belt 41 connected to the pulley 124 may be rotated, and by the rotation of the belt 41, the rotatable tub pulley 42 may be rotated. When the rotatable tub pulley 42 is rotated, the rotatable tub 40 connected to the rotatable tub pulley 42 through the drive shaft 43 may be rotated.

Referring to FIG. 9, the stator 110 may be mounted on the bracket 200 of the motor fixing structure 100 according to an embodiment of the disclosure. The bracket 200 of the motor fixing structure 100 according to an embodiment of the disclosure may include the main body unit 210, the front mount 220, and the rear mount 260.

Referring to FIG. 10, the main body unit 210 has a tubular shape, and a space in which the stator 110 is mounted may be provided inside the main body unit 210. The main body unit 210 according to an embodiment of the disclosure may have a cylindrical shape, and the stator 110 may have a circular shape to correspond to the shape of the main body unit 210.

The front mount 220 may be provided on the front 211 of the main body unit 210 and may include the front fastening hole 231. The front mount 220 may protrude in a circumferential direction from the front 211 of the main body unit 210, and the front mount 220 may include the front fastening hole 231 that may be coupled to the tub 10 of a washing machine.

Referring to FIGS. 5 and 6, the first fastening protrusion 21 into which the front fastening hole 231 may be inserted may be provided on the rear surface 12 of the tub 10 of a washing machine. Referring to FIGS. 5 and 6, when the first fastening protrusion 21 is inserted into the front fastening hole 231 of the front mount 220, the front mount 220 may be assembled in connection to the tub 10 of a washing machine.

The first fixing component 232 may be inserted into the front fastening hole 231 of the front mount 220, and in a state in which the first fixing component 232 is inserted into the front fastening hole 231, the first fastening protrusion 21 may be inserted into the front fastening hole 231. The first fixing component 232 may be tightly fitted into the first fastening protrusion 21, and a hole having a diameter less than a diameter of the first fastening protrusion 21 may be formed in the first fixing component 232.

The first fixing component 232 according to an embodiment includes an elastic body and may be deformable. Diameters of one end and the other end of the first fixing component 232 may be greater than a diameter of the front fastening hole 231, and through this, when the first fixing component 232 is inserted into the front fastening hole 231, the first fixing component 232 may not be separated.

The first fixing component 232 includes an elastic body and may be deformable, and the first fixing component 232 may include rubber. When the first fixing component 232 is inserted into the front fastening hole 231, the first fixing component 232 may be inserted into the front fastening hole 231 while applying deformation to the first fixing component 232.

According to an embodiment of the disclosure, after the first fixing component 232 is inserted into the front fastening hole 231, the first fastening protrusion 21 may be inserted into the front fastening hole 231. The first fastening protrusion 21 may be inserted by being tightly fitted into the front fastening hole 231 narrowed by the first fixing component 232.

Referring to FIGS. 5 and 6, the groove 23 may be provided inside the first fastening protrusion 21 according to an embodiment of the disclosure. When the first fastening protrusion 21 is fitted into the front fastening hole 231, the first fastening protrusion 21 may be deformed by the groove 23 of the first fastening protrusion 21.

The first fastening protrusion 21 includes an elastic material, and when the first fastening protrusion 21 is deformed, restoring force to return to the original state may be generated in the first fastening protrusion 21. By this restoring force, the first fastening protrusion 21 may be firmly coupled to the front fastening hole 231.

Figure 11:
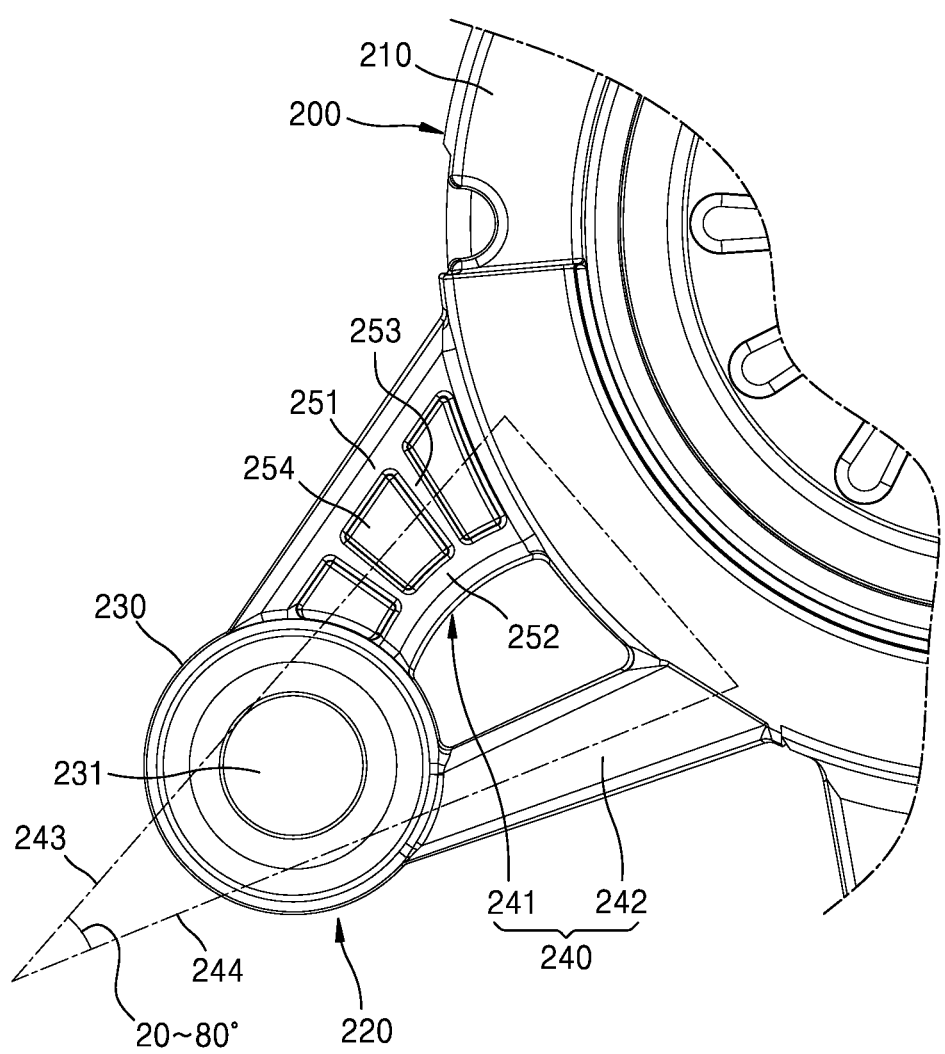
FIG. 11 is an enlarged view of a front mount in FIG. 8.

FIG. 11 is an enlarged view of the front mount 220 in FIG. 8. Referring to FIG. 11, the front mount 220 according to an embodiment of the disclosure may include a front fastening unit 230 provided with the front fastening hole 231, and a front connection unit 240 having one side connected to the front fastening unit 230 and the other side connected to the main body unit 210.

The front fastening unit 230 may be provided with the front fastening hole 231, and the front fastening unit 230 may be spaced apart in a circumferential direction of the main body unit 210. The front connection unit 240 may connect the front fastening unit 230 and the main body unit 210, and the front connection unit 240 may include a rib.

The front connection unit 240 according to an embodiment of the disclosure may include a first front connection unit 241 connecting the main body unit 210 to the front fastening unit 230, and a second front connection unit 242 connecting the main body unit 210 to the front fastening unit 230.

Because the front mount 220 is a position where the most force is applied when the rotatable tub (basket) is rotated through the stator 110, the rotor 121, and the rotation shaft 122, the main body unit 210 and the front fastening unit 230 according to an embodiment of the disclosure may be connected to each other through two front connection units 240 (the first front connection unit 241 and the second front connection unit 242). However, the disclosure is not limited thereto, and the main body unit 210 and the front fastening unit 230 according to an embodiment of the disclosure may be connected to each other through two or more front connection units 240, and may also be connected through one front connection unit 240.

When the front connection unit 240 according to an embodiment includes the first front connection unit 241 and the second front connection unit 242, the first front connection unit 241 and the second front connection unit 242 may have different shapes from each other. The first front connection unit 241 and the second front connection unit 242 may have different shapes depending on a load generated by rotation of the rotor 121 and the rotation shaft 122.

Referring to FIG. 11, the first front connection unit 241 according to an embodiment of the disclosure may include a straight unit 251, a curved unit 252, and a reinforcing rib 253, and a rib groove 254. The straight unit 251 may extend in a straight line and connect the main body unit 210 to the front fastening unit 230. The curved unit 252 may extend in a curved line and connect the main body unit 210 to the front fastening unit 230.

The straight unit 251 and the curved unit 252 may be apart from each other, and the reinforcing rib 253 may connect the straight unit 251 to the curved unit 252. A plurality of reinforcing ribs 253 may be provided, and may connect the straight unit 251 to the curved unit 252. The rib groove 254 may be formed between the plurality of reinforcing ribs 253.

When the straight unit 251 and the curved unit 252 are used and the reinforcing rib 253 and the rib groove 254 are formed between the straight unit 251 and the curved unit 252, a load applied to the front connection unit 242 may be effectively distributed while reducing a weight of the first front connection unit 241.

The second front connection unit 242 according to an embodiment of the disclosure may be formed in a bar shape. When the second front connection unit 242 may be formed in a bar shape with a varying thickness, a thickness of the second front connection unit 242 may be increased as the second front connection unit 242 extends in a direction toward the front fastening unit 230 from the main body 210.

However, shapes of the first front connection unit 241 and the second front connection unit 242 are not limited thereto, and depending on a load applied to the first front connection unit 241 and the second front connection unit 242, the shapes of the first front connection unit 241 and the second front connection unit 242 may vary.

The first front connection unit 241, the second front connection unit 242, and one side surface of the main body unit 210 according to an embodiment of the disclosure may be formed in a triangular shape. For example, referring to FIG. 11, a line connecting a point where the main body unit 210 is coupled to the first front connection unit 241 to a point where the main body unit 210 is coupled to the second front connection unit 242, an extension line of the first front connection unit 241, and an extension line of the second front connection unit 242 may form a triangular shape.

Referring to FIG. 11, an angle formed between a first straight line 243 crossing a center of the first front connection unit 241 and a second straight line 244 crossing a center of the second front connection unit 242 may be 20 degrees to 80 degrees.

In order for the first front connection unit 241, the second front connection unit 242, and one side of the main body 210 to form a triangular shape, the angle formed between the first straight line 243 crossing the center of the first front connection unit 241 and the second straight line 244 crossing the center of the second front connection unit 242 may be 20 degrees to 80 degrees.

Here, the first straight line 243 crossing the center of the first front connection unit 241 may be a line connecting a center of the point where the main body unit 210 is connected to the first front connection unit 241, to a center of a point where the front fastening unit 230 is connected to the second front connection unit 242. In addition, the second straight line 244 crossing the center of the second front connection unit 242 may be a line connecting a center of a point where the main body unit 210 is connected to the second front connection unit 242, to a line connecting a center of a point where the front fastening unit 230 is connected to the second front connection unit 242.

When the first front connection unit 241, the second front connection unit 242, and the one side of the main body unit 210 according to an embodiment form a triangular shape, a load applied to the front mount 220 may be effectively distributed.

The rear mount 260 may be provided on the rear 212 of the main body unit 210 and may include the rear fastening hole 271. The rear mount 260 may protrude in a circumferential direction from the rear 212 of the main body unit 210, and the rear mount 260 may include the rear fastening hole 271 that may be coupled to the tub 10 of a washing machine.

Referring to FIGS. 5 and 6, the second fastening protrusion 22 that may be inserted into the rear fastening hole 271 may be provided on the rear surface 12 of the tub 10 of a washing machine. Referring to FIGS. 5 and 6, when the second fastening protrusion 22 is inserted into the rear fastening hole 271 of the rear mount 260, the rear mount 260 may be assembled in connection to the tub 10 of a washing machine.

The second fixing component 272 may be inserted into the rear fastening hole 271 of the rear mount 260 according to an embodiment of the disclosure, and in a state in which the second fixing component 272 is inserted into the rear fastening hole 271, the rear fastening hole 271 may be inserted into the second fastening protrusion 22. The second fixing component 272 may be tightly fitted into the second fastening protrusion 22, and a hole having a diameter less than a diameter of the second fastening protrusion 22 may be formed in the second fixing component 272.

The incision groove 273 may be formed outside the second fixing component 272 according to an embodiment of the disclosure. The second fixing component 272 may be inserted into the rear fastening hole 271 while being deformed by the incision groove 273.

The second fixing component 272 may include an elastic material, and when the second fixing component 272 is deformed by the incision groove 273, restoring force to return to the original state may be generated in the second fixing component 272. By this restoring force, the second fixing component 272 may be inserted into the rear fastening hole 271 without being separated.

According to an embodiment of the disclosure, after the second fixing component 272 is inserted into the rear fastening hole 271, the second fastening protrusion 22 may be inserted into the rear fastening hole 271. Referring to FIGS. 5 and 6, the coupling protrusion 24 may be provided outside the second fastening protrusion 22 according to an embodiment of the disclosure. When the second fastening protrusion 22 is inserted into the rear fastening hole 271, the coupling protrusion 24 of the second fastening protrusion 22 may press the inside the rear fastening hole 271, and the second fastening protrusion 22 may be firmly coupled to the rear fastening hole 271.

The first fastening protrusion 21 and the second fastening protrusion 22 according to an embodiment of the disclosure may be provided on the rear surface 12 of the tub 10 of a washing machine, and the first fastening protrusion 21 and the second fastening protrusion 22 may be spaced apart from each other.

Referring to FIG. 5, the front mount 220 and the rear mount 260 may be respectively assembled in connection to the first fastening protrusion 21 and the second fastening protrusion 22 provided in the tub 10 of a washing machine, and the front mount 220 and the rear mount 260 may be assembled in connection to the tub 10 of a washing machine while being spaced apart from each other.

The rear mount 260 according to an embodiment of the disclosure may include a rear fastening unit provided with the rear fastening hole 271, and a rear connection unit 280 having one side connected to the rear fastening unit 270 and the other side connected to the main body unit 210.

The rear fastening unit 270 may be provided with the rear fastening hole 271, and the rear fastening unit 270 may protrude in the circumferential direction of the main body unit 210. The rear connection unit 280 may connect the rear fastening unit 270 to the main body unit 210.

An end of the rear mount 260 according to an embodiment of the disclosure may protrude outward more than the rear 212 of the main body unit 210. Referring to FIG. 9, an end of the rear mount 260 may protrude to the outside toward a direction in which the rear 212 of the main body unit 210 faces.

For example, an end of the rear fastening unit 270 of the rear mount 260 may protrude outward more than the rear 212 of the main body unit 210. The rear connection unit 280 according to an embodiment of the disclosure may extend to the outside toward a direction in which the rear 212 of the main body unit 210 faces, and the rear fastening unit 270 may be connected to the main body unit 210 through the rear connection unit 280.

When the rear fastening unit 270 is connected to the main body unit 210 through the rear connection unit 280, as the rear connection unit 280 extends to the outside toward a direction in which the rear 212 of the main body unit 210 faces, an end of the rear fastening unit 270 may protrude outward more than the rear 212 of the main body unit 210, as shown in FIG. 9.

When the end of the rear mount 260 protrudes outward more than the rear 212 of the main body unit 210, sizes of the stator 110 and the rotor 121 may be easily changed in a state in which a spaced distance between the front mount 220 and the rear mount 260 is not changed.

In order to increase rotational force of the motor, it is necessary to use a motor having a large size, and depending on the size of the motor, the sizes of the stator 110 and the rotor 121 may be changed. According to an embodiment of the disclosure, the stator 110 and the rotor 121 may be stacked and used depending on the size of the motor.

In order to additionally stack the stator 110 and the rotor 121, depending on the size of the motor, it is necessary to increase a size of the main body unit 210. Because the pulley 124 and a belt are provided in a direction in which the front mount 220 is provided, it is difficult to increase the size of the main body unit 210 in the direction in which the front mount 220 is provided.

However, when the end of the rear mount 260 protrudes outward more than the rear 212 of the main body unit 210, the spaced distance between the front mount 220 and the rear mount 260 may not be changed, even when the size of the main body unit 210 is increased in a direction to the rear 212.

For example, referring to FIG. 9, a space for changing the size of the main body unit 210 is generated as much as the end of the rear mount 260 protrudes outward more than the rear 212 of the main body unit 210.

Accordingly, even when the size of the main body unit 212 is increased in the direction to the rear 212 so as to additionally stack the stator 110 and the rotor 121, the spaced distance between the front mount 220 and the rear mount 260 may not be changed.

As described above, when the end of the rear mount 260 according to an embodiment protrudes outward more than the rear 212 of the main body unit 210, in a state in which the spaced distance between the front mount 220 and the rear mount 260 is not changed, the size of the main body unit 210 may be changed so that the stator 110 and the rotor 121 may be additionally stacked.

A plurality of front mounts 220 may be provided on the front 211 of the main body 210, and one or more rear mounts 260 may be provided on the rear 212 of the main body unit 210.

Referring to FIG. 8, according to an embodiment of the disclosure, two front mounts 220 may be provided on the front surface of the main body unit 210, and when one rear mount 260 is provided on the rear surface of the main body unit 210, one rear mount 260 may be provided between the two front mounts 220.

When one rear mount 260 is provided between two front mounts 220, an extension line in a direction in which the rear fastening hole 271 of the one rear mount 260 extends is arranged between extension lines in directions in which the front fastening hole 231 in each of the two front mounts 220 respectively extends.

The front mount 220 is a location which receives the most force when the rotatable tub (basket) is rotated through the stator 110, the rotor 121, and the rotation shaft 122, and when the two front mounts 220 are provided in the main body unit 210, the force may be distributed.

In this case, vibration or lifting may occur between the two front mounts 220 where the force is distributed. According to an embodiment of the disclosure, when one rear mount 260 is provided between the two front mounts 220, the one rear mount 260 between the two front mounts 220 distributes the force, so as to prevent vibration or lifting from occurring between the two front mounts 220.

According to an embodiment of the disclosure, in a first circle C1 of the main body unit 210, a third circle C3 concentric with the first circle C1 and passing through a center portion of the front fastening hole 231, and a second circle C2 concentric with the first circle C1 and passing through the center of the rear fastening hole 271, a structure in which a size of a diameter of the first circle C1<a size of a diameter of the second circle C2<a size of a diameter of the third circle C3 may be obtained.

Referring to FIG. 8, the main body unit 210 according to an embodiment of the disclosure may be formed in a circular shape, and the first circle C1 may be a circle corresponding to the main body unit 210 having the circular shape. The center of the first circle C1 may coincide with the center of the main body unit 210, and the first circle C1 may be formed along an outer shape of the main body unit 210 having the circular shape.

The second circle C2 may be concentric with the first circle C1 and may pass through the center of the rear fastening hole 271. The center of the second circle C2 may be a same as the center of the first circle C1, and the center of the second circle C2 may coincide with the center of the main body unit 210.

The second circle C2 may pass through the center of the rear fastening hole 271, and the second circle C2 may be a circle of which the radius is a line connecting the center of the main body unit 210 to the center of the rear fastening hole 271 and which is formed by rotating in a circumferential direction based on the center of the main body unit 210.

The third circle C3 may be concentric with the first circle C1 and may pass through the center of the front fastening hole 231. The center of the third circle C3 may be a same as the center of the first circle C1, and the center of the third circle C3 may be a same as the center of the main body unit 210.

The third circle C3 may pass through the center of the front fastening hole 231, and the third circle C3 may be a circle of which the radius is a line connecting the center of the main body unit 210 to the center of the front fastening hole 231 and which is formed by rotating in the circumferential direction based on the center of the main body unit 210.

According to an embodiment of the disclosure, a size of the diameter of the third circle C3 may be greater than a size of the diameter of the second circle C2, and a size of the diameter of the second circle C2 may be greater than a size of the diameter of the first circle C1. Because the front mount 220 protrudes in the circumferential direction from a front surface of the main body unit 210 and the rear mount 260 protrudes in the circumferential direction from the rear 212 of the main body unit 210, the size of the diameter of the second circle C2 and the size of the diameter of the third circle C3 may each be greater than the size of the diameter of the first circle C1.

In addition, according to an embodiment of the disclosure, the size of the diameter of the third circle C3 may be greater than the size of the diameter of the second circle C2, and through this, the front fastening hole 231 may protrude outward from the center of the main body unit 210 more than the rear fastening hole 271.

The front mount 220 may be a location to which the most force is applied when the rotatable tub (basket) is rotated through the stator 110, the rotor 121, and the rotation shaft 122. According to an embodiment of the disclosure, when the size of the diameter of the third circle C3 is greater than the size of the diameter of the second circle C2 so that the front fastening hole 231 protrudes outward from the center of the main body unit 210 more than the rear fastening hole 271, force applied to the main body 210 may be easily distributed to the tub 10 through the front mount 220.

When the force is distributed through the front mount 220, vibration or lifting may occur between the two front mounts 220. According to an embodiment of the disclosure, when the size of the diameter of the second circle C2 is less than the size of the diameter of the third circle C3 so that the rear fastening hole 271 does not protrude to the outside of the main body unit 210 more than the front fastening hole 231, vibration or lifting may be prevented through the rear mount 260 from occurring between the two front mounts 220.

The main body unit 210, the front mount 220, and the rear mount 260 according to an embodiment of the disclosure may be integrally injection molded. When the main body unit 210, the front mount 220, and the rear mount 260 are simultaneously integrally injection molded, an additional mount for assembling the motor fixing structure 100 to the tub 10 of a washing machine may not be assembled.

Through this, a strength and dimensions of the motor fixing structure 100 may be reduced, and when the main body unit 210, the front mount 220, and the rear mount 260 are simultaneously integrally injection molded, manufacturing precision may also be improved.

In addition, the main body unit 210, the front mount 220, and the rear mount 260 according to an embodiment of the disclosure may be integrally die-cast through a metal object. Die casting according to an embodiment of the disclosure is a precision casting method in which molten metal is injected into a mold to obtain a casting identical to that of the mold.

According to an embodiment of the disclosure, in order to manufacture the main body unit 210, the front mount 220, and the rear mount 260 integrally, molds corresponding to shapes of the main body unit 210, the front mount 220, and the rear mount 260 may be manufactured.

When the molds corresponding to the shapes of the main body unit 210, the front mount 220, and the rear mount 260 are manufactured, molten metal may be injected into the mold so as to integrally manufacture the main body unit 210, the front mount 220, and the rear mount 260 through a metal object.

As described above, when the main body unit 210, the front mount 220, and the rear mount 260 are manufactured integrally by die-casting through a metal object, precision of dimensions may be improved. Furthermore, because the dimensions are accurate, there is no need for trimming, and accordingly, a motor fixing structure with excellent mechanical properties may be manufactured.

The motor fixing structure 100 according to an embodiment of the disclosure may be provided in the main body unit 210, and may further include a terminal unit 290, which is provided with a connection terminal 291 connected to the stator 110.

The terminal unit 290 is provided with the connection terminal 291 for supplying electrical energy to the stator 110, and the stator 110 may be connected to the connection terminal 291 to receive electrical energy through the connection terminal 291.

Figure 12:
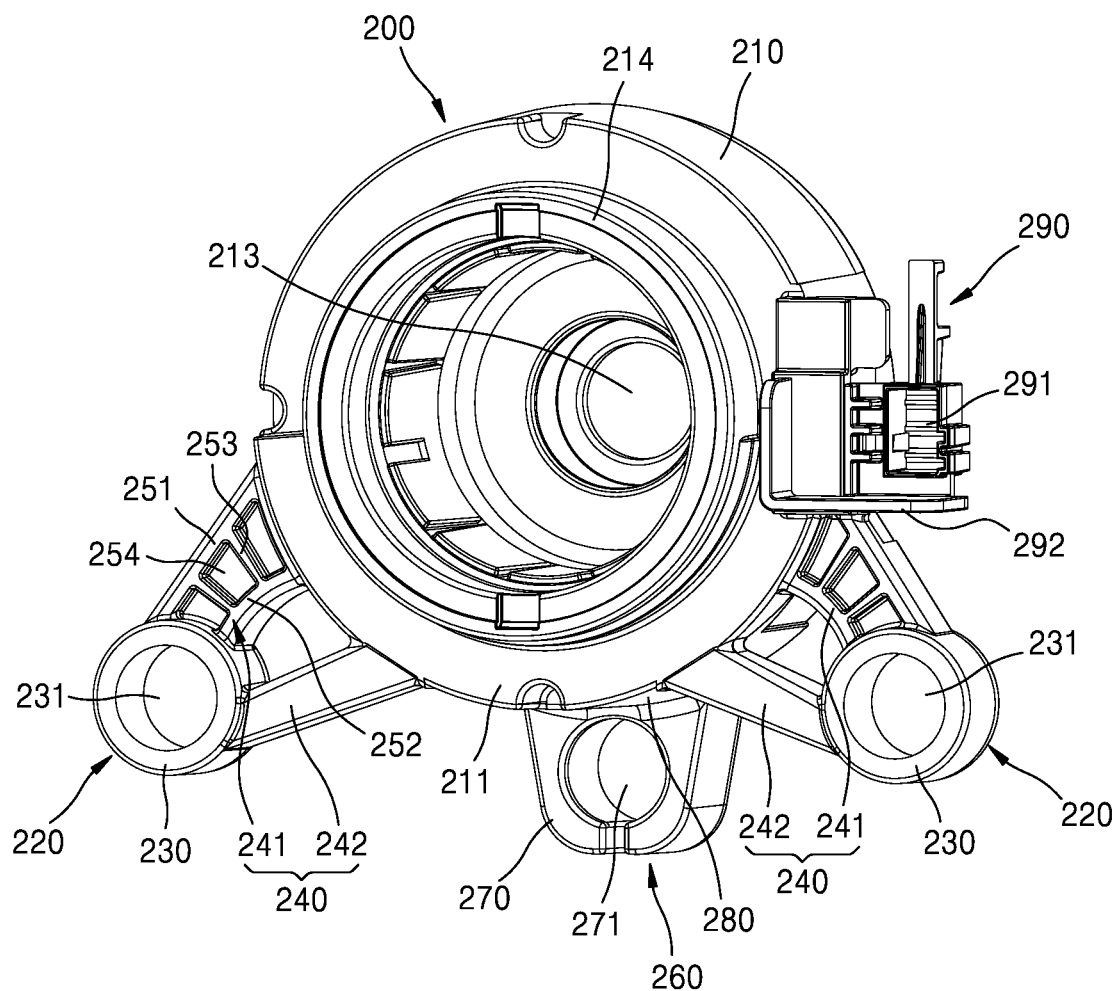
FIG. 12 is a schematic perspective view illustrating a main body unit which is injection molded after a stator and a terminal unit are insert-injected into the main body unit, according to an embodiment of the disclosure.

FIG. 12 is a schematic perspective view illustrating that the stator 110 and the terminal unit 290 are insert-injected and then, the main body unit 210 is injection molded, according to an embodiment of the disclosure. Referring to FIG. 12, the main body unit 210 according to an embodiment of the disclosure may be injection molded after the stator 110 is inserted thereinto.

For example, when the main body unit 210 is injection molded, the stator 110 may be inserted into a mold, and then the main body unit 210 may be injection molded. In this case, the front mount 220 and the rear mount 260 may be integrally injection molded together with the main body unit 210 when the main body unit 210 is injection molded.

When the stator 110 is manufactured together with the main body unit 210 through insert injection molding, an additional assembly member for assembling the stator 110 to the main body unit 210 may not be required. Through this, productivity of a motor fixing structure may be improved.

In addition, the main body unit 210 according to an embodiment of the disclosure may be injection molded after the terminal unit 290 is inserted thereinto. For example, when the main body unit 210 is injection molded, the terminal unit 290 may be inserted into a mold and then, the main body unit 210 may be injection molded. In this case, the front mount 220 and the rear mount 260 may be integrally injection molded together with the main body unit 210 when the main body unit 210 is injection molded.

Figure 13:
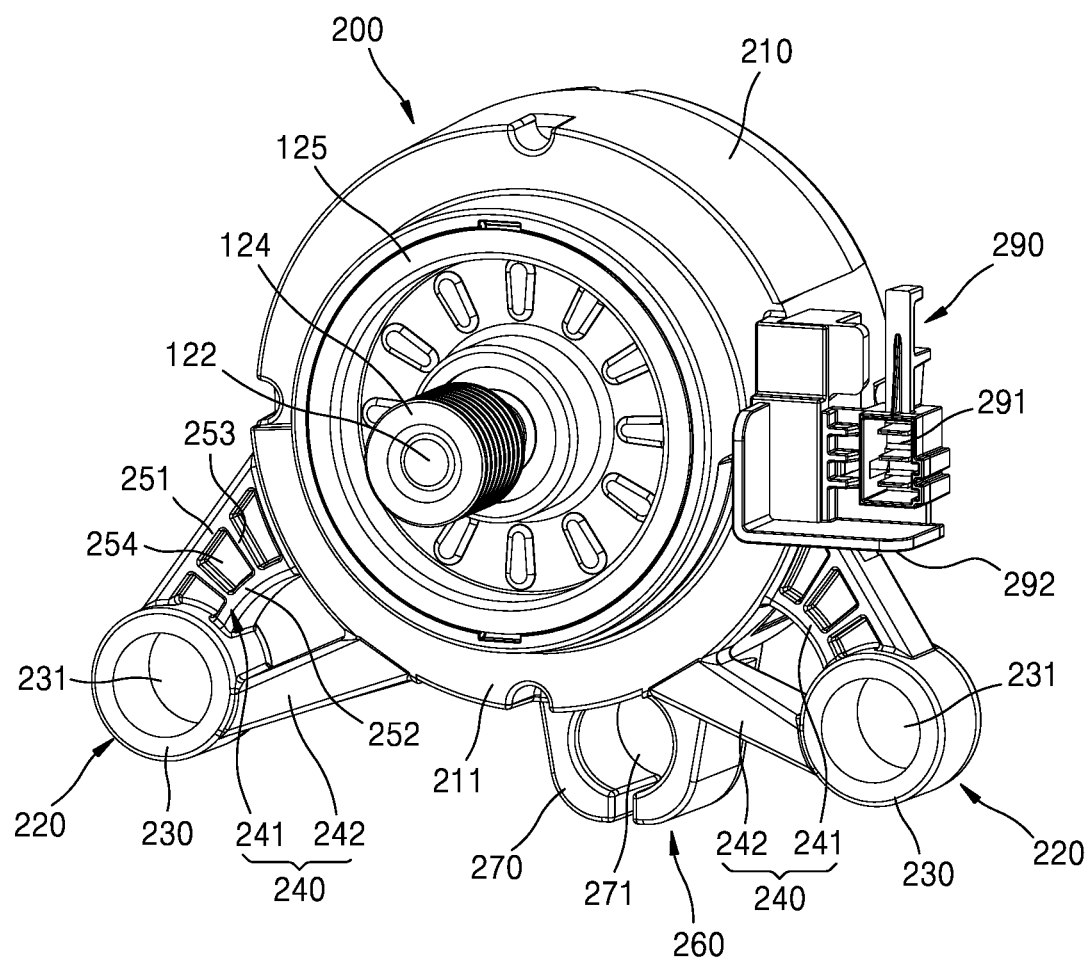
FIG. 13 is a schematic diagram of a case in which a rotor and a rotation shaft are inserted into a main body unit in which a stator and a terminal unit are insert-injected, and the rotor and the rotation shaft are assembled through a coupling cover, according to an embodiment of the disclosure.
Figure 14:
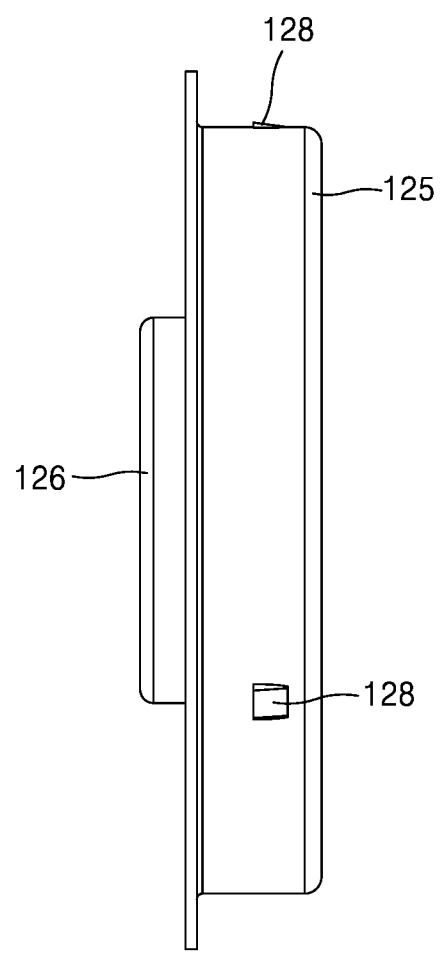
FIG. 14 is a schematic diagram illustrating a coupling cover according to an embodiment of the disclosure.
Figure 15:
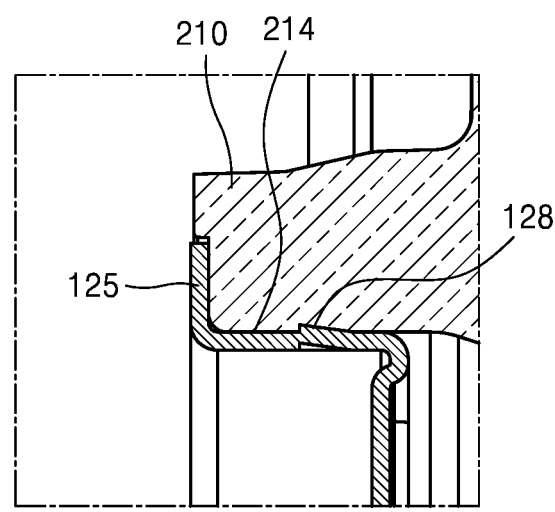
FIG. 15 is a schematic diagram illustrating a cross-section when a caulking protrusion of a coupling cover is inserted into an inner groove of a main body unit, according to an embodiment of the disclosure.

FIG. 13 is a schematic diagram illustrating that the rotor 121 and the rotation shaft 122 are inserted into the main body 210 in which the stator 110 and the terminal unit 290 are insert-injected, and the rotor 121 and the rotation shaft 122 are assembled through a coupling cover 125, according to an embodiment of the disclosure. FIG. 14 is a schematic diagram illustrating the coupling cover 125 according to an embodiment of the disclosure, and FIG. 15 is a schematic diagram illustrating a cross-sectional view when a caulking protrusion 128 of the coupling cover 125 is inserted into an inner groove 214 of the main body unit 210, according to an embodiment of the disclosure.

Referring to FIGS. 10 and 13, the motor fixing structure 100 according to an embodiment of the disclosure may further include a coupling bearing 127 arranged on one side of the rotor 121 and coupled to the rotation shaft 122, a fixing bearing 123 arranged on the other side of the rotor 121 and coupled to the rotation shaft 122, and the coupling cover 125 press-fitted to the main body unit 210 after the rotor 121 and the rotation shaft 122 are mounted inside the main body unit 210.

In addition, referring to FIGS. 10 and 12, a fixing groove 213 into the fixing bearing 123 is press-fitted may be provided inside the main body unit 210 according to an embodiment of the disclosure, and a coupling groove 126 into which the coupling bearing 127 is press-fitted may be provided in the coupling cover 125.

Referring to FIGS. 10 and 14, on an outer circumferential surface of the coupling cover 125 according to an embodiment of the disclosure, the caulking protrusion 128 protruding outward from the outer circumferential surface of the coupling cover 125 may be provided.

An outwardly widened inclination may be formed on the caulking protrusion 128 according to an embodiment of the disclosure. For example, a cross section of the caulking protrusion 128 is formed in a right triangle shape, so that the caulking protrusion 128 protrudes from the outer circumferential surface of the coupling cover 125. An inclination surface having an inclination in a direction from one side of the coupling cover 125 toward the other side may be formed on a side surface of the caulking protrusion 128 according to an embodiment of the disclosure.

A method of assembling the rotor 121 and the rotation shaft 122 by press-fitting the same into the main body unit 210, according to an embodiment of the disclosure, is described below. Referring to FIG. 12, the fixing bearing 123 coupled to the rotation shaft 122 may be press-fitted into the fixing groove 213 of the main body unit 210, so that the rotor 121 and the rotation shaft 122 may be inserted into the main body unit 210.

After the rotor 121 and the rotation shaft 122 are inserted into the main body unit 210, the coupling cover 125 may be coupled to the main body unit 210. The coupling cover 125 may be press-fitted into the main body unit 210, and in this case, the coupling bearing 127 coupled to the rotation shaft 122 may be press-fitted into the coupling groove 126 of the coupling cover 125.

As described above, through a process of press-fitting the fixing bearing 123 into the fixing groove 213 of the main body unit 210, a process of press-fitting the coupling cover 125 into the main body unit 210, and a process of press-fitting the coupling bearing 127 into the coupling groove 126 of the coupling cover 125, the rotor 121 and the rotation shaft 122 may be assembled in connection to the main body unit 210.

Figure 16:
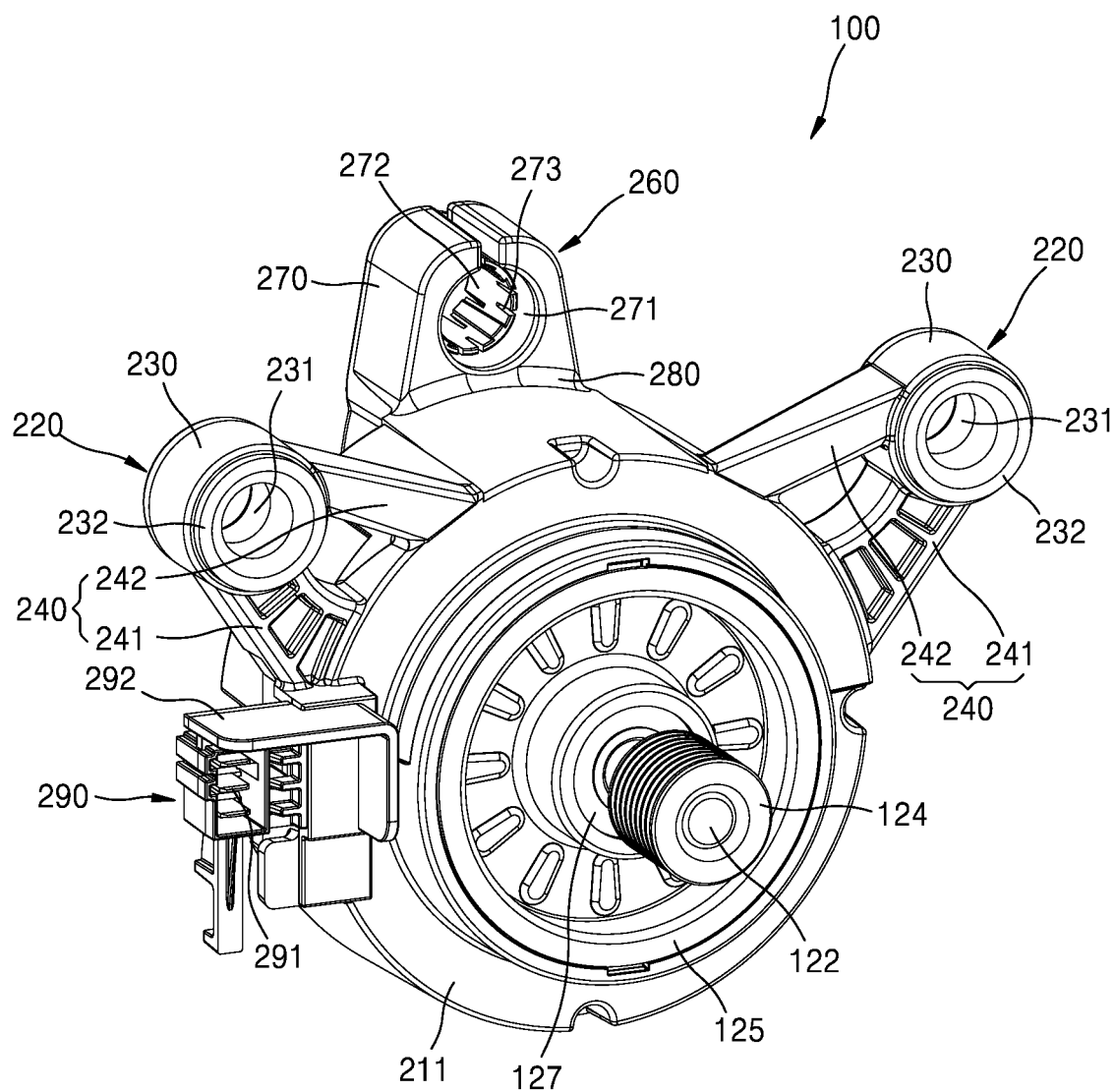
FIG. 16 is a schematic diagram illustrating a state in which a front mount and a rear mount of a motor fixing structure are arranged upward, according to an embodiment of the disclosure.

FIG. 16 is a diagram illustrating a state in which the front mount 220 and the rear mount 260 of the motor fixing structure 100 is disposed on top, according to an embodiment of the disclosure. Referring to FIGS. 5 and 16, when the motor fixing structure 100 according to an embodiment of the disclosure is coupled to the tub 10 of a washing machine, the front mount 220 and the rear mount 260 are disposed over the main body unit 210. In this case, there is a risk that water may flow into the connection terminal 291 of the terminal unit 290 due to an operation of the washing machine.

Referring to FIG. 16, a first terminal cover 292 for preventing water from flowing into the connection terminal 291 may be provided in the terminal unit 290 according to an embodiment of the disclosure. The first terminal cover 292 may be formed in a plate shape and may cover at least one of an upper portion or a side portion of the connection terminal 291. The first terminal cover 292 according to an embodiment of the disclosure may be formed in an L-shaped plate. As described above, when the first terminal cover 292 is provided in the terminal unit 290, water may be prevented from flowing into the connection terminal 291 due to an operation of the washing machine.

Figure 17:
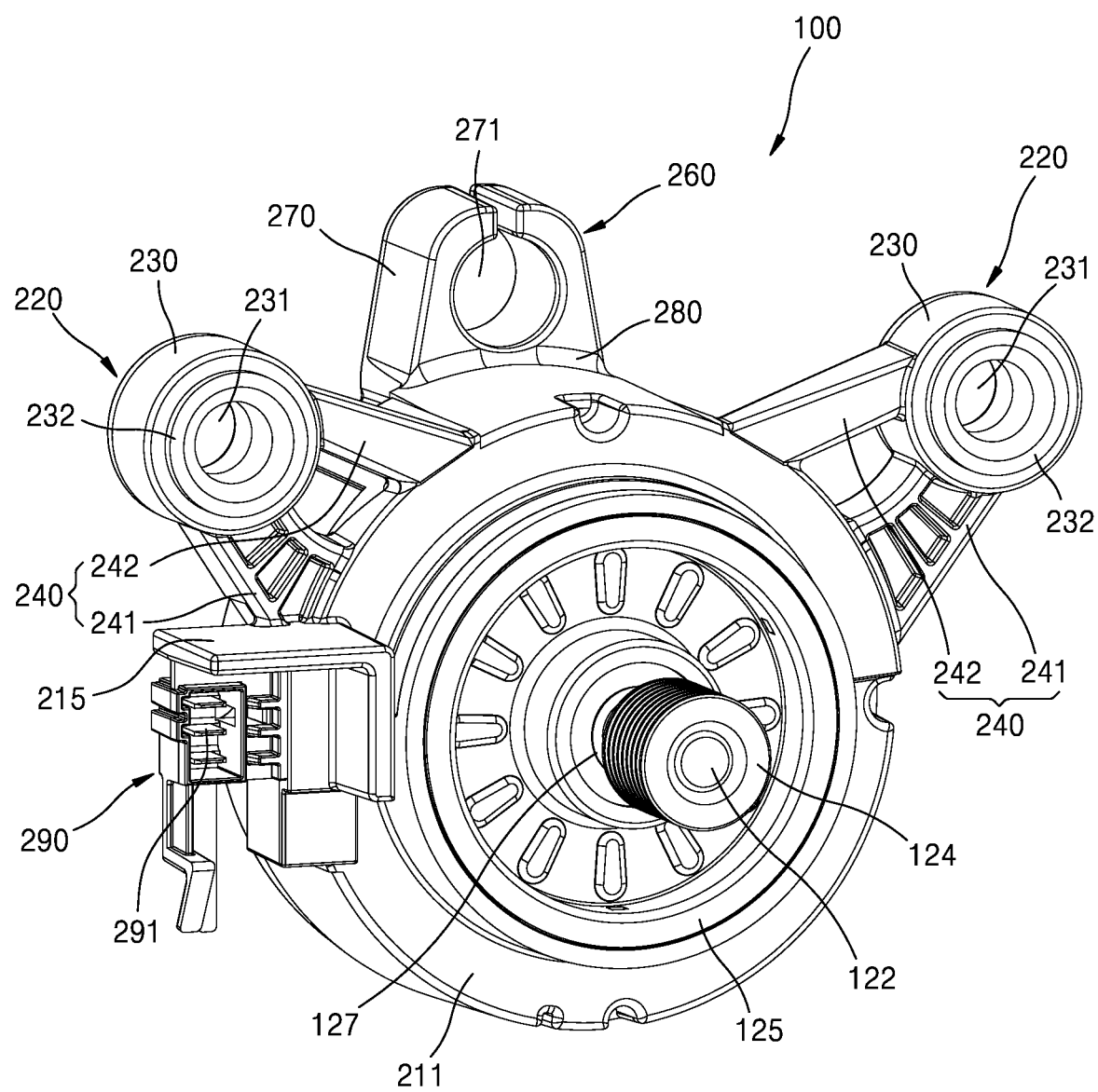
FIG. 17 is a schematic diagram illustrating a second terminal cover integrally provided with a main body unit, according to an embodiment of the disclosure.

Referring to FIG. 17, a second terminal cover 215 for preventing water from flowing into the connection terminal 291 may be provided in the main body unit 210 according to an embodiment of the disclosure. The second terminal cover 215 may be formed in a plate shape and may cover at least one of the upper portion or a side portion of the connection terminal 291. The second terminal cover 215 according to an embodiment of the disclosure may be formed in an L-shaped plate.

The second terminal cover 215 according to an embodiment of the disclosure may be injection molded integrally with the main body unit 210. In this case, the second terminal cover 215 may be injection molded integrally with the main body unit 210 after the terminal unit 290 is inserted into the main body unit 210.

The first terminal cover 292 according to an embodiment of the disclosure may include a same material as the terminal unit 290 having the connection terminal 291, and the terminal unit 290, which has the connection terminal 291, and the first terminal cover 292 may include a thermoplastic resin.

The thermoplastic resin is a material that may be burned, and when a fire occurs in the washing machine 1 and the motor fixing structure 100, the first terminal cover 292 and the terminal unit 290 each including a thermoplastic resin may be exposed to the outside and burned.

To prevent this, the second terminal cover 215 may be provided in the main body unit 210. The second terminal cover 215 may include a thermosetting resin, and by covering the terminal unit 290 through the second terminal cover 215 including the thermosetting resin, the terminal unit 290 may be prevented from being burned in the event of a fire.

According to an embodiment of the disclosure, the first terminal cover 292 may be provided in the terminal unit 290, and the second terminal cover 215 may be provided in the main body unit 210. In this case, the terminal unit 290 having the first terminal cover 292 may be inserted into the main body unit 210, and then, the second terminal cover 215 may be injection molded integrally with the main body unit 210.

A process of assembling the motor fixing structure 100, according to an embodiment of the disclosure, is described below. According to an embodiment of the disclosure, the main body unit 210 may be injection molded after the stator 110 and the terminal unit 290 are inserted thereinto.

Accordingly, after inserting the stator 110 and the terminal unit 290 into positions at which the stator 110 and the terminal unit 290 are arranged inside the main body unit 210, the main body unit 210 may be injection molded. When the main body unit 210 is injection molded, the main body unit 210, the front mount 220, and the rear mount 260 may be injection molded integrally.

After injection molding the main body unit 210, the front mount 220, and the rear mount 260 integrally, the rotor 121 and the rotation shaft 122 may be assembled in connection to the main body unit 210. Referring to FIG. 12, in order to assemble the rotor 121 and the rotation shaft 122 in connection to the main body unit 210, the fixing bearing 123 provided on the other side of the rotor 121 and coupled to the rotation shaft 122 may be press-fitted into the fixing groove 213 of the main body unit 210.

Press-fitting is to press and push into a narrow hole or groove, and the fixing groove 213 according to an embodiment of the disclosure may be a groove having a width less than a width of the fixing bearing 123. When the fixing bearing 123 is pressed and pushed into the fixing groove 213, the fixing bearing 123 may be press-fitted into the fixing groove 213, so that the rotor 121 and the rotation shaft 122 may be assembled inside the main body unit 210.

After the rotor 121 and the rotation shaft 122 are assembled in connection to the main body unit 210, the coupling cover 125 may be press-fitted into the main body unit 210. Referring to FIG. 12, the inner groove 214 having a width less than a width of the coupling cover 125 may be provided inside the main body unit 210 according to an embodiment of the disclosure, and when the coupling cover 125 is pressed and pushed into the inner groove 214 of the main body unit 210, the coupling cover 125 may be assembled in connection to the main body unit 210.

Referring to FIGS. 14 and 15, when the coupling cover 125 is press-fitted into the main body unit 210, the caulking protrusion 128 of the coupling cover 125 may be tightly fitted into the inner groove 214 of the main body unit 210. A downward inclination surface may be formed in a direction in which the coupling cover 125 is inserted into the main body unit 210, on a side surface of the caulking protrusion 128, and the coupling cover 125 may be inserted into the inner groove 214 of the main body unit 210 along the downward inclination surface of the caulking protrusion 128.

When the coupling cover 125 is press-fitted into the main body unit 210, the caulking protrusion 128 of the coupling cover 125 may be tightly fitted into the inner groove 214 of the main body unit 210, and the caulking protrusion 128 may be pressed by the inner groove 214 of the main body unit 210.

When the caulking protrusion 128 of the coupling cover 125 is pressed by the inner groove 214 of the main body unit 210, deformation may occur in the caulking protrusion 128.

When the deformation occurs in the caulking protrusion 128, restoring force to return to the original state may be generated in the caulking protrusion 128, so that the coupling cover 125 may be firmly coupled to the main body unit 210.

Strengths of the coupling cover 125 and the caulking protrusion 128 according to an embodiment of the disclosure may each be greater than a strength of the main body unit 210. For example, the coupling cover 125 and the caulking protrusion 128 according to an embodiment of the disclosure may include iron, and the main body unit 210 may include a plastic injection molding (resin).

Because the strength of the caulking protrusion 128 is greater than the strength of the main body unit 210, in order for the caulking protrusion 128 to be separated from the main body unit 210, the caulking protrusion 128 must destroy the main body unit 210. Thus, through the caulking protrusion 128, the coupling cover 125 and the main body unit 210 may be further firmly coupled to each other at a high temperature.

The coupling groove 126 may be provided in the coupling cover 125, and when the coupling cover 125 is press-fitted into the main body unit 210, a portion of the rotation shaft 122 may pass through the coupling groove 126 and protrude to the outside of the main body unit 210.

When the coupling cover 125 is press-fitted into the main body unit 210, the coupling bearing 127 provided on one side of the rotor 121 and coupled to the rotation shaft 122 may be press-fitted into the coupling groove 126. The coupling groove 126 of the coupling cover 125 may be a groove having a width less than a width of the coupling bearing 127, and when the coupling bearing 127 is press-fitted into the coupling groove 126, one side of the rotation shaft 122 may be fixed to the coupling cover 125.

As described above, the other side of the rotation shaft 122, mounted on the rotor 121, may be fixed to the fixing groove 213 inside the main body unit 210 through the fixing bearing 123, and one side of the rotation shaft 122 may be fixed to the coupling groove 126 of the coupling cover 125 through the coupling bearing 127. Through this, the rotor 121 and the rotation shaft 122 may be assembled in connection to the main body unit 210.

A process of assembling the motor fixing structure 100 to the washing machine 1, according to an embodiment of the disclosure, is described below.

The motor fixing structure 100 according to an embodiment of the disclosure may be assembled in connection to the washing machine 1 through the tub 10, and the motor fixing structure 100 may be coupled to the tub 10 through the first fastening protrusion 21 and the second fastening protrusion 22, which are provided on the rear surface 12 of the tub 10.

For example, as the first fastening protrusion 21 is inserted into the front fastening hole 231 of the motor fixing structure 100, and the second fastening protrusion 22 is inserted into the rear fastening hole 271 of the motor fixing structure 100, the motor fixing structure 100 may be coupled to the rear surface 12 of the tub 10.

According to an embodiment of the disclosure, when the first fastening protrusion 21 is inserted into the front coupling hole 231 of the motor fixing structure 100 and the second fastening protrusion 22 is inserted into the rear fastening hole 271, the first fixing component 232 and the second fixing component 272 may be used so that the first fastening protrusion 21 and the second fastening protrusion 22 are separated from the front fastening hole 231 and the rear fastening hole 271.

According to an embodiment of the disclosure, when the motor fixing structure 100 is coupled to the tub 10, after the first fixing component 232 is inserted into the front fastening hole 231, the first fastening protrusion 21 may be inserted into the front fastening hole 231. In addition, when the motor fixing structure 100 is coupled to the tub 10, after the second fixing component 272 is inserted into the rear fastening hole 271, the second fastening protrusion 22 may be inserted into the rear fastening hole 271.

As described above, after the first fixing component 232 is inserted into the front fastening hole 231, the first fastening protrusion 21 may be inserted into the front fastening hole 231, and after the second fixing component 272 is inserted into the rear fastening hole 271, the second fastening protrusion 22 may be inserted into the rear fastening hole 271, so that the motor fixing structure 100 may be coupled to the tub 10.

According to an embodiment of the disclosure, the pulley 124 to which the belt 41 is connected may be provided on one side of the rotation shaft 122, and the rotatable tub pulley 42 connected to the rotation shaft 40 through the drive shaft 43 may be provided on the rear surface 12 of the tub 10. After the motor fixing structure 100 is coupled to the rear surface 12 of the tub 10, the pulley 124 of the rotation shaft 122 and the belt 41 of the rotatable tub pulley 42 may be connected to each other.

According to an embodiment of the disclosure, when the rotation shaft 122 is rotated by interaction between the stator 110 and the rotor 121, the pulley 124 provided on one side of the rotation shaft 122 may be rotated. When the pulley 124 is rotated, the belt 41 connected to the pulley 124 may be rotated, and through the rotation of the belt 41, the rotatable tub pulley 42 may be rotated. When the rotatable tub pulley 42 is rotated, the rotatable tub 40 connected to the rotatable tub pulley 42 through the drive shaft 43 may be rotated.

The motor fixing structure 100 and the washing machine 1 including the motor fixing structure 100 according to an embodiment of the disclosure may have effects as described below.

Figure 18:
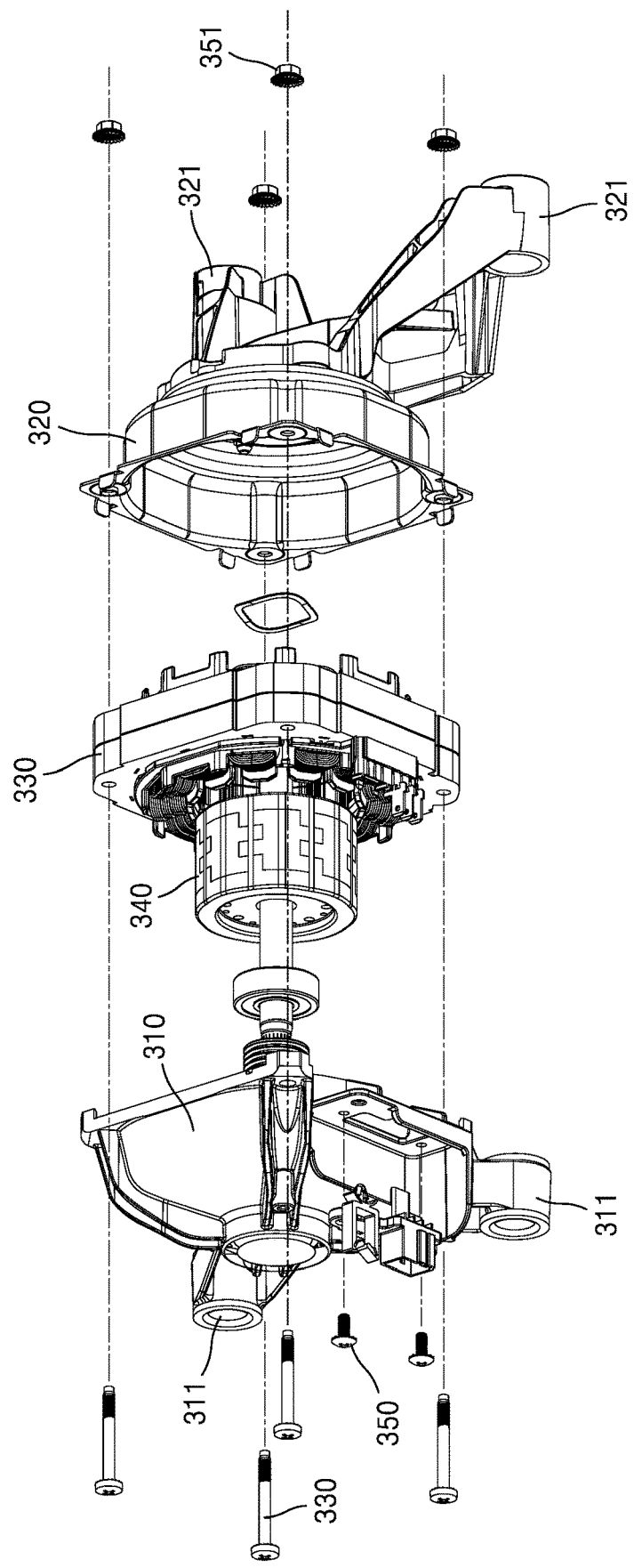
FIG. 18 is a schematic diagram illustrating a motor fixing structure assembled with bolts while a front bracket and a rear bracket are separated.

FIG. 18 is a diagram schematically illustrating a motor fixing structure assembled with a bolt 350 while a bracket 310 and a rear bracket 320 are separated from each other. To fix a motor including the stator 330 and the rotor 340 to a tub of a washing machine, a structure in which the front bracket 310 and the rear bracket 320 are separated from each other may be used.

The motor fixing structure of FIG. 18 may be assembled by arranging the stator 330 and the rotor 340 between the front bracket 310 and the rear bracket 320 and coupling the bolt 350 to a nut 351.

The motor fixing structure of FIG. 18 may be assembled in connection to a washing machine by coupling the front mount 311 provided in the front bracket 310 to a coupling protrusion of a tub of the washing machine and coupling the rear mount 321 provided in the rear bracket 320 to a coupling protrusion of the tub of the washing machine.

The motor fixing structure of FIG. 18 may use at least four bolts so as to firmly couple the front bracket 310 to the rear bracket 320. In addition, in the motor fixing structure in which the front bracket 310 and the rear bracket 320, in order to couple the front bracket 310 and the rear bracket 320, which are separated from each other, to the tub, two mounts may be coupled to each of the front bracket 310 and the rear bracket 320, and thus, four mounts may be required.

In addition, when the front bracket 310 and the rear bracket 320 are assembled as in the motor fixing structure of FIG. 8, in order to maintain the strength of an assembled portion, the front bracket 310 and the rear bracket 320 must be manufactured of a metal material.

However, in a motor fixing structure as shown in FIG. 18, productivity decreases as the front bracket 310 and the rear bracket 320 must be coupled to each other through the bolt 350, and it is difficult to ensure dimensional accuracy during assembly as two additional mounts must be provided for assembling each of the front bracket 310 and the rear bracket 320.

In addition, in a motor fixing structure as shown in FIG. 18, because the front bracket 310 and the rear bracket 320 must be coupled to each other through the bolt 350 and the front mount 311 and the rear mount 321 must be coupled to the front bracket 310 and the rear bracket 320, respectively, when tolerances occur, tolerances accumulate due to assembly.

However, the motor fixing structure 100 according to an embodiment of the disclosure is manufactured by integrally injection molding the main body unit 210, the front mount 220, and the rear mount 260, so that dimension accuracy of the motor fixing structure 100 may be improved while reducing dimensions of the motor fixing structure.

In addition, because the motor fixing structure 100 according to an embodiment of the disclosure is manufactured by integrally injection molding the main body unit 210, the front mount 220, and the rear mount 260 without assembly, tolerances due to assembly may be reduced, and accumulated tolerances may be prevented from occurring as the assembly progresses.

In addition, because the motor fixing structure 100 according to an embodiment of the disclosure is manufactured by integrally injection molding the main body unit 210, the front mount 220, and the rear mount 260, it is not necessary to use four mounts by coupling two mounts to each of the front bracket and the rear bracket, and a coupling strength may be maintained even when only three mounts are used for the main body unit 210.

As in the motor fixing structure of FIG. 18, when the front bracket 310 and the rear bracket 320, which are separated from each other, are assembled, in order to maintain a strength at an assembled portion, the front bracket 310 and the rear bracket 320 must be manufactured of a metal material.

However, because the motor fixing structure 100 according to an embodiment of the disclosure is manufactured by integrally injection molding the main body unit 210, the front mount 220, and the rear mount 260, an assembled portion may not be generated, and through this, the motor fixing structure 100 may be manufactured as an injection-molding material.

In addition, because the motor fixing structure 100 according to an embodiment of the disclosure is manufactured by integrally injection molding the main body unit 210, the front mount 220, and the rear mount 260, the motor fixing structure 100 may be manufactured from an injection molding material having high strength.

In the motor fixing structure as shown in FIG. 18, the front bracket 310 and the rear bracket 320 must be coupled to each other through the bolt 350, at least four bolts 350 must be used. In order to couple the front bracket 310 and the rear bracket 320 through the at least four bolts 350, a space into which the at least four bolts 350 may be fitted may be required in the front bracket 310 and the rear bracket 320.

Accordingly, the front bracket 310 and the rear bracket 320 of the motor fixing structure of FIG. 18 must be manufactured in a quadrangular shape for a space for insertion of the bolts 350. In the motor fixing structure of FIG. 18, when the front bracket 310 and the rear bracket 320 are formed in a quadrangular shape, the stator 330 assembled in connection to the front bracket 310 and the rear bracket 320 may also be formed in a quadrangular shape.

The stator 330 includes a core around which a coil is wound, and it is preferable that the core is formed in a circular shape so as to be wound, and no other space may be required.

Accordingly, manufacturing the stator 330 in a quadrangular shape as in the motor fixing structure of FIG. 18 has a problem of increasing a size of the motor regardless of the performance of the motor. In addition, when the stator 330 is assembled in a separate state from the front bracket 310 and the rear bracket 320, there is a problem in that corrosion occurs due to external exposure of the stator.

However, the motor fixing structure 100 according to an embodiment of the disclosure is manufactured by integrally injection molding the main body unit 210, the front mount 220, and the rear mount 260, and as separate assembly bolts or separate mounts may not be used, the main body unit 210 and the stator 110 may be manufactured in a circular shape.

In the motor fixing structure 100 according to an embodiment of the disclosure, the main body unit 210 and the stator 110 are manufactured in a circular shape, and thus, the size of the motor may not be increased regardless of the performance of the motor.

In addition, because the motor fixing structure 100 according to an embodiment of the disclosure is manufactured by injection molding the main body unit 210 after inserting the stator 110 into the main body unit 210, corrosion may be prevented by preventing the external exposure of the stator 110.

In addition, in the motor fixing structure 100 according to an embodiment of the disclosure, the stator 110 is manufactured together with the main body unit 210 through insert injection, and thus, an additional assembly member for assembling the stator 110 to the main body unit 210 may not be required. Through this, the productivity of the motor fixing structure 100 may be improved.

Along with the above, in the motor fixing structure 100 according to an embodiment of the disclosure, because an end of the rear mount 260 protrudes outward more than the rear 212 of the main body unit 210, sizes of the stator 110 and the rotor 121 may be easily changed without changing a spaced distance between the front mount 220 and the rear mount 260.

In order to additionally stack the stator 110 and the rotor 121, depending on the size of the motor, the size of the main body unit 210 must be increased. Because the pulley 124 and the belt are provided in a direction in which the front mount 220 is provided, it is difficult to increase the size of the main body unit 210 in the direction in which the front mount 220 is provided.

However, in the motor fixing structure 100 according to an embodiment of the disclosure, an end of the rear mount 260 protrudes outward more than the rear 212 of the main body unit 210, and thus, even when the size of the main body unit 210 is increased in the direction toward the rear 212, a spaced distance between the front mount 220 and the rear mount 260 may not be changed.

For example, a space for changing the size of the main body unit 210 may be generated as much as the end of the rear mount 260 protrudes outward more than the rear 212 of the main body unit 210. Thus, even when the size of the main body unit 210 is increased in the direction toward the rear 212 of the main body unit 210 so as to additionally stack the stator 110 and the rotor 121, the spaced distance between the front mount 220 and the rear mount 260 may not be changed.

Accordingly, in the motor fixing structure 100 according to an embodiment of the disclosure, because the end of the rear mount 260 protrudes outward more than the rear 212 of the main body unit 210, the size of the main body unit 210 may be changed so as to additionally stack the stator 110 and the rotor 121, without changing the spaced distance between the front mount 220 and the rear mount 260.

Effects that may be obtained from the disclosure are not limited to the effects described above, and a person having ordinary skill in the art to which the disclosure pertains would clearly understand other effects not described above, from the descriptions above.

For understanding of the disclosure, reference characters are described in embodiments shown in the drawings, and although certain terms are used to describe the embodiments, the disclosure is not limited by the certain terms, and the disclosure may include all elements that may be commonly conceived by a person having ordinary skill in the art.

Certain executions described in the disclosure are embodiments, and are not construed to limit the scope of the disclosure in any way. For brevity of the disclosure, descriptions of related-art electronic elements, control systems, software, and other functional aspects of the systems may be omitted. In addition, connections of lines or connection members between elements shown in the drawings represent functional connections and/or physical or circuit connections by way of example, and in actual devices, may be presented as alternative or additional various functional, physical, or circuit connections. In addition, when there is no specific reference such as "essential" or "important", an element may not be a necessary element for the application of the disclosure. The expressions "comprise", "include", and "have" used herein are used to be understood in terms of an open end of the technology.

In the specification of the disclosure (especially in the claims), the use of the term "above" and similar indicating terms may correspond to both the singular and the plural. In addition, when a range is described in the disclosure, it includes an embodiment to which an individual value in the range is applied (unless there is a statement to the contrary), and is the same as that each individual value constituting the range is described in the detailed description of the disclosure. Last, regarding operations constituting a method according to the disclosure, the operations may be performed in an appropriate order unless the order is clearly stated or stated to the contrary. The disclosure is not necessarily limited to the described order of the operations.

The use of all examples or exemplary language (e.g., etc.) is merely intended to explain the disclosure in detail, and the scope of the disclosure is not limited to the examples or the exemplary language unless limited by the claims. In addition, a person having ordinary skill in the art to which the disclosure pertains would clearly understand that various modifications may be easily made without departing from the scope and the idea of the disclosure.

A motor fixing structure according to an embodiment of the disclosure may provide a motor fixing structure that is easy to assemble by integrally injection-molding a front mount, a rear mount, and a main body unit.

In a motor fixing structure according to an embodiment of the disclosure, a front mount, a rear mount, and a main body unit are integrally injection molded, so that dimensional precision may be ensured during assembly, and productivity of the motor fixing structure may be improved.

A motor fixing structure according to an embodiment of the disclosure is manufactured by injection molding a main body unit after inserting a stator into the main body unit, so that corrosion may be prevented by preventing external exposure of the stator.

In a motor fixing structure according to an embodiment and a motor fixing bracket according to an embodiment of the disclosure, an end of a rear mount protrudes outward more than a rear surface of a main body unit, so that sizes of a stator and a rotor may be changed without changing a spaced distance between a front mount and the rear mount.

A motor fixing structure according to an embodiment of the disclosure may be a structure for fixing a motor to an electronic device.

According to an embodiment of the disclosure, a motor fixing structure may include a stator including a core around which a coil is wound, a rotor arranged inside the stator, and rotated by interacting with the stator, a rotation shaft mounted on the rotor and rotated together with the rotor, and a bracket on which the stator is mounted.

According to an embodiment of the disclosure, the bracket may include a main body unit including a space in which the stator is mounted, a front mount provided on a front surface of the main body unit and including a front fastening hole, and a rear mount provided on a rear surface of the main body unit and including a rear fastening hole.

According to an embodiment of the disclosure, the main body, the front mount, and the rear mount of the motor fixing structure may be integrally injection molded.

According to an embodiment of the disclosure, the front mount of the motor fixing structure may protrude in a circumferential direction from a front surface of the main body unit, a plurality of front mounts may be provided on the front surface of the main body unit, and the rear mount may be provided between two front mounts.

According to an embodiment of the disclosure, the front mount of the motor fixing structure may include a front fastening unit in which the front fastening hole is provided, and a front connection unit having one side connected to the front fastening unit and the other side connected to the main body unit.

According to an embodiment of the disclosure, the front connection unit of the motor fixing structure may include a first front connection unit connecting the main body unit to the front fastening unit, and a second front connection unit connecting the main body unit to the front fastening unit, wherein the first front connection unit and the second front connection unit may have different shapes from each other.

According to an embodiment of the disclosure, the first front connection unit of the motor fixing structure may include a straight unit extending in a straight line and connecting the main body unit to the front fastening unit, a curved unit extending in a curved line and connecting the main body unit to the front fastening unit, a plurality of reinforcing ribs connecting between the straight unit and the curved unit, and a rib groove formed between the plurality of reinforcing ribs.

According to an embodiment of the disclosure, an angle between a first straight line crossing a center of the first front connection unit of the motor fixing structure and a second straight line crossing a center of the second front connection unit may be 20 degrees to 80 degrees.

According to an embodiment of the disclosure, an end of the rear mount of the motor fixing structure may protrude outward more than a rear surface of the main body unit.

According to an embodiment of the disclosure, the main body unit of the motor fixing structure may be injection molded after the stator is inserted into the main body unit.

According to an embodiment of the disclosure, the motor fixing structure may further include a connection terminal provided in the main body and connected to the stator, and a terminal unit 290 which has a plate shape and has a first terminal cover capable of covering at least one of an upper portion or a side portion of the connection terminal, wherein the main body unit is injection molded after the terminal unit is inserted into the main body unit.

According to an embodiment of the disclosure, the motor fixing structure may further include a terminal unit which is provided in the main body unit and has a connection terminal connected to the stator, wherein a second terminal cover capable of covering at least one of an upper portion or a side portion of the connection terminal is provided in the main body unit, and the second terminal cover may be integrally injection molded with the main body unit after the terminal unit is inserted.

According to an embodiment of the disclosure, the main body unit, the front mount, and the rear mount may be integrally die-cast through a metal object.

According to an embodiment of the disclosure, in a first circle, a third circle which is concentric with the first circle and passes through a center of the front fastening hole, and a second circle which is concentric with the first circle and passes through a center of the rear fastening hole, of the main body unit of the motor fixing structure, the motor fixing structure may have a structure in which a size of a diameter of the first circle<a size of a diameter of the second circle<a size of a diameter of the third circle.

According to an embodiment of the disclosure, the motor fixing structure may further include a coupling bearing coupled to the rotation shaft and arranged on one side of the rotor, a fixing bearing coupled to the rotation shaft and arranged on the other side of the rotor, and a coupling cover press-fitted and assembled in connection to the main body unit after the rotator and the rotation shaft are mounted inside the main body unit, wherein a fixing groove into which the fixing bearing is press-fitted may be provided inside the main body, and a coupling groove into which the coupling bearing is press-fitted may be provided in the coupling cover.

According to an embodiment of the disclosure, while the fixing bearing coupled to the rotation shaft of the motor fixing structure is press-fitted into the fixing groove, the rotor and the rotation shaft may be inserted into the main body unit, and after the rotor and the rotation shaft are inserted into the main body unit, while the coupling cover is press-fitted into the main body unit, the coupling bearing coupled to the rotation shaft may be press-fitted into the coupling groove of the coupling cover.

According to an embodiment to the disclosure, a caulking protrusion protruding outward from an outer circumferential surface of the coupling cover may be provided on the outer circumferential surface of the coupling cover, and an outwardly widened inclination may be formed on the caulking protrusion.

According to an embodiment of the disclosure, the motor fixing structure may further include a first fixing component to be inserted into the front fastening hole, and a second fixing component to be inserted into the rear fastening hole, wherein the first fixing component may include an elastic body, and diameters of one end and the other end of the first fixing component is greater than a diameter of the front fastening hole, and an incision groove may be formed outside the second fixing component.

According to an embodiment of the disclosure, a washing machine includes a cabinet, a tub which is arranged inside the cabinet, and has an opened front surface and has a coupling housing on a rear surface thereof, a rotatable tub rotatably arranged inside the tub, and a motor fixing structure coupled to the tub and providing power to the rotatable tub, wherein the motor fixing structure includes a stator having a core around which a coil is wound, a rotor arranged inside the stator and rotated by interacting with the stator, a rotation shaft mounted on the rotor and rotated together with the rotor, and a bracket on which the stator is to be mounted, and the bracket includes a main body unit having a space in which the stator is mounted, a front mount provided on a front surface of the main body unit and including a front fastening hole, and a rear mount provided on a rear surface of the main body unit and including a rear fastening hole.

According to an embodiment of the disclosure, the washing machine may further include a first fastening protrusion inserted into the front fastening hole and protruding outward from a lower portion of a rear surface of the tub, and a second fastening protrusion inserted into the rear fastening hole and protruding from the lower portion of the rear surface of the tub to the outside.

According to an embodiment of the disclosure, after a first fixing component is inserted into the front fastening hole, the first fastening protrusion may be inserted into the front fastening hole, after a second fixing component is inserted into the rear fastening hole, the second fastening protrusion may be inserted into the rear fastening hole, the first fixing component may include an elastic body, and diameters of one end and the other end of the first fixing component may be greater than a diameter of the front fastening hole, and an incision hole may be formed outside the second fixing component, and a coupling protrusion may be provided outside the second fastening protrusion.

According to an embodiment of the disclosure, the washing machine may further include a rotatable tub pulley rotatably installed on a rear surface of the tub (10) and connected to the rotatable tub through a drive shaft, and a belt connecting a pulley, which is coupled to one side of the rotation shaft, to the rotatable tub pulley.

According to an embodiment of the disclosure, a bracket of a motor fixing structure may be a bracket of a motor fixing structure for fixing a motor to an electronic device.

According to an embodiment of the disclosure, the bracket of the motor fixing structure may include a main body unit having a space in which a stator is mounted, the stator having a core around which a coil is wound, a front mount provided on a front surface of the main body unit and including a front fastening hole, and a rear fastening hole provided on a rear surface of the main body unit.

According to an embodiment of the disclosure, the main body unit, the front mount, and the rear mount of the bracket of the motor fixing structure may be integrally injection molded.

According to an embodiment of the disclosure, the main body unit, the front mount, and the rear mount of the bracket of the motor fixing structure may be integrally die-cast through a metal object.

According to an embodiment of the disclosure, the front mount of the bracket of the motor fixing structure may protrude in a circumferential direction from a front surface of the main body unit, a plurality of front mounts may be provided on the front surface of the main body unit, and the rear mount may be provided between two front mounts.

According to an embodiment of the disclosure, the front mount of the bracket of the motor fixing structure may include a front fastening unit in which the front fastening hole is provided, and a front connection unit having one side connected to the front fastening unit and the other side connected to the main body unit.

According to an embodiment of the disclosure, the front connection unit of the bracket of the motor fixing structure may include a first front connection unit connecting the main body unit to the front fastening unit, and a second front connection unit connecting the main body unit to the front fastening unit, wherein the first front connection unit and the second front connection unit may have different shapes from each other.

According to an embodiment of the disclosure, an angle between a first straight line crossing a center of the first front connection unit of the bracket of the motor fixing structure and a second straight line crossing a center of the second front connection unit may be 20 degrees to 80 degrees.

According to an embodiment of the disclosure, an end of the rear mount of the bracket of the motor fixing structure may protrude outward more than a rear surface of the main body unit.

According to an embodiment, the main body unit of the bracket of the motor fixing structure may be injection molded after the stator is inserted into the main body unit.

According to an embodiment of the disclosure, the main body unit, the front mount, and the rear mount of the bracket of the motor fixing structure may be integrally die-cast through a metal object.

According to an embodiment of the disclosure, a first circle, a third circle which is concentric with the first circle and passes through a center of the front fastening hole, and a second circle which is concentric with the first circle and passes through a center of the rear fastening hole, of the main body unit of the bracket of the motor fixing structure, the motor fixing structure may have a structure in which a size of a diameter of the first circle<a size of a diameter of the second circle<a size of a diameter of the third circle.

The invention claimed is:

1. An apparatus comprising:
    a motor including:
        a stator including a core,
        a rotor inside the stator, and rotatable by interacting with the stator, and
        a rotation shaft mounted on the rotor so as to be rotatable together with the rotor, and
    a bracket including:
        a main body unit including a space in which the stator is mounted, and
        a front mount at a front of the main body unit, and including a front fastening hole, and
        a rear mount at a rear of the main body unit and including a rear fastening hole.

2. The apparatus of claim 1, wherein the main body, the front mount, and the rear mount are integrally injection molded structure.

3. The apparatus of claim 1, wherein the rear mount includes:
    a rear fastening unit including the rear fastening hole, and
    a rear connection unit having one side connected to the rear fastening unit and another side connected to the main body unit.

4. The apparatus of claim 1, wherein the front mount includes:
    a front fastening unit including the front fastening hole; and a front connection unit having one side connected to the front fastening unit and another side connected to the main body unit.

5. The apparatus of claim 4, wherein the front connection unit includes;
a first front connection unit connecting the main body unit to the front fastening unit, and a second front connection unit connecting the main body unit to the front fastening unit, and
the first front connection unit is shaped differently than the second front connection unit.

6. The apparatus of claim 5, wherein
an angle between a first straight line extending longitudinally through a center of the first front connection unit and a second straight line extending longitudinally through a center of the second front connection unit is 20 degrees to 80 degrees.

7. The apparatus of claim 1, wherein a rear of the rear mount protrudes further in a rearward direction than the rear of the main body unit.

8. The apparatus of claim 1, wherein the main body unit is injection molded after the stator is inserted into the main body unit.

9. The apparatus of claim 1, further comprising:
a connection terminal in the main body unit and connected to the stator; and
a terminal unit including a first terminal cover, the first terminal cover configured in a plate shape to cover at least one of an upper portion and a side portion of the connection terminal,
wherein the main body unit is injection molded after the terminal unit is inserted into the main body unit.

10. The apparatus of claim 1, further comprising;
a terminal unit in the main body unit and including a connection terminal connected to the stator, and
a second terminal cover in the main body unit to cover at least one of an upper portion and a side portion of the connection terminal, and
wherein the second terminal cover is integrally injection molded with the main body unit after the terminal portion is inserted.

11. The apparatus of claim 1, wherein,
with a first circle around the main body unit being concentric with a second circle passing through a center of the rear fastening hole, and the second circle being concentric with a third circle passing through a center of the front fastening hole, the apparatus has a structure in which a diameter of the first circle (C1)<a diameter of the second circle (C2)<a diameter of the third circle (C3).

12. The apparatus of claim 1, further comprising:
a coupling bearing on one side of the rotor and coupled to the rotation shaft;
a fixing bearing on another side of the rotor and coupled to the rotation shaft;
a coupling cover press-fitted and connected to the main body unit after the rotor and the rotation shaft are mounted inside the main body unit;
a fixing groove in the main body unit and into which the fixing bearing is press-fitted; and
a coupling groove in the coupling cover and into which the coupling bearing is press-fitted.

13. The apparatus of claim 12, wherein, while the fixing bearing coupled to the rotation shaft is press-fitted into the fixing groove, the rotor and the rotation shaft are inserted into the main body unit, and after the rotor and the rotation shaft are inserted into the main body unit, while the coupling cover is press-fitted into the main body unit, the coupling bearing coupled to the rotation shaft is press-fitted into the coupling groove of the coupling cover.

14. The apparatus of claim 13, wherein
the coupling cover includes a caulking protrusion protruding outward from an outer circumferential surface of the coupling cover, and
an outwardly widened inclination is formed on the caulking protrusion.

15. The apparatus of claim 1, further comprising;
a first fixing component inserted into the front fastening hole, and a second fixing component inserted into the rear fastening hole and including an incision groove on an outer diameter of the second fixing component,
wherein the first fixing component includes an elastic body, and diameters of one end of the first fixing component and diameters of another end of the first fixing component are greater than a diameter of the front fastening hole.

16. A washing machine comprising:
a cabinet;
a tub inside the cabinet and having an opened front surface;
a rotatable tub inside the tub; and
a motor configured to rotate the rotatable tub, the motor including:
a stator including a core,
a rotor inside the stator and rotatable by interacting with the stator,
a rotation shaft mounted on the rotor so as to be rotatable together with the rotor and
a bracket including:
a main body unit including a space in which the stator is mounted, and
a front mount at a front of the main body unit, and including a front fastening hole, and
a rear mount at a rear of the main body unit, and including a rear fastening hole.

17. The washing machine of claim 16, further comprising:
a first fastening protrusion inserted into the front fastening hole and protruding outward from a lower portion of a rear surface of the tub; and
a second fastening protrusion inserted into the rear fastening hole and protruding outward from the lower portion of the rear surface of the tub.

18. The washing machine of claim 17, wherein, after a first fixing component is inserted into the front fastening hole, a first fastening protrusion is inserted into the front fastening hole,
after a second fixing component is inserted into the rear fastening hole a second fastening protrusion is inserted into the rear fastening hole,
the first fixing component comprises an elastic body, and diameters of one end and another end of the first fixing component are greater than a diameter of the front fastening hole, and
an incision groove is formed outside the second fixing component, and a coupling protrusion is provided outside the second fastening protrusion.

19. The washing machine of claim 16, further comprising:
a rotatable tub pulley installed on a rear surface of the tub;
a drive shaft connecting the rotatable tub pulley to the rotatable tub;
a pulley coupled to the rotation shaft; and
a belt connecting the pulley to the rotatable tub pulley.

20. A bracket of a motor fixing structure for fixing a motor to an device, the bracket comprising:
- a main body unit including a space in which a stator is mounted, the stator including a core;
- a front mount at a front of the main body unit and including a front fastening hole; and
- a rear mount at a rear of the main body unit and comprising a rear fastening hole,
- wherein the main body unit, the front mount, and the rear mount are an integrally injection molded structure.

* * * * *